(12) United States Patent
Slesarenko et al.

(10) Patent No.: US 11,934,422 B2
(45) Date of Patent: Mar. 19, 2024

(54) SYSTEM AND A METHOD OF FAST JAVA OBJECT MATERIALIZATION FROM DATABASE DATA

(71) Applicant: Huawei Technologies Co., Ltd., Shenzhen (CN)

(72) Inventors: Alexander Vladimirovich Slesarenko, Moscow (RU); Junchao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 809 days.

(21) Appl. No.: 17/008,166

(22) Filed: Aug. 31, 2020

(65) Prior Publication Data

US 2020/0394202 A1    Dec. 17, 2020

Related U.S. Application Data

(63) Continuation of application No. PCT/RU2018/000232, filed on Apr. 12, 2018.

(51) Int. Cl.
*G06F 16/25* (2019.01)
*G06F 9/455* (2018.01)
(Continued)

(52) U.S. Cl.
CPC ......... *G06F 16/256* (2019.01); *G06F 9/4552* (2013.01); *G06F 9/545* (2013.01);
(Continued)

(58) Field of Classification Search
CPC ...... G06F 16/256; G06F 9/4552; G06F 9/545; G06F 9/547; G06F 16/24552; G06F 16/289; G06F 9/465
See application file for complete search history.

(56) References Cited

U.S. PATENT DOCUMENTS 9,225,799 B1 * 12/2015 Dong .................. H04L 67/01
9,600,546 B2    3/2017 Shivarudraiah et al.
(Continued)

FOREIGN PATENT DOCUMENTS

WO    2017095257 A1    6/2017

OTHER PUBLICATIONS

Agrawal et al., "Simplifying Distributed Application Upgrades with Simultaneous Execution," Total 27 pages, XP055528368 (Nov. 2005).
(Continued)

*Primary Examiner* — Angelica Ruiz
(74) *Attorney, Agent, or Firm* — Leydig, Voit & Mayer, Ltd.

(57) ABSTRACT

An apparatus for extracting data from a database for object initialization, and apparatus for writing object data to a database, and corresponding methods are provided. A data extraction kernel on the native-side reads database data from a plurality of locations in the database using a database interface and writes the database data to a buffer using a native-side buffer API (application programming interface). An object initialization kernel on the virtual machine (VM-) side reads the database data from the buffer using a native-side buffer API and initializes a plurality of objects. Information indicating one of the plural memory regions in the buffer where the data extraction kernel writes the database data is known to the native-side buffer API and to the VM-side buffer API. According to the application, fast and memory efficient data exchange between a native side and VM side is achieved.

16 Claims, 26 Drawing Sheets

(51) Int. Cl.
*G06F 9/54* (2006.01)
*G06F 16/2455* (2019.01)
*G06F 16/28* (2019.01)

(52) U.S. Cl.
CPC ........ *G06F 9/547* (2013.01); *G06F 16/24552* (2019.01); *G06F 16/289* (2019.01)

(56) References Cited

U.S. PATENT DOCUMENTS

| | | | |
|---|---|---|---|
| 2013/0191560 A1* | 7/2013 | Aho | G06F 5/14 710/57 |
| 2014/0189262 A1* | 7/2014 | Dawson | G06F 5/08 711/154 |
| 2017/0123835 A1* | 5/2017 | Mizuno | G06F 9/5077 |

OTHER PUBLICATIONS

Lee et al., "Efficient Java Native Interface for Android Based Mobile Devices," 2011 International Joint Conference of IEEE TrustCom—11/IEEE ICESS—11/FCST-11, IEEE Computer Society, pp. 1202-1209, XP032086937, Institute of Electrical and Electronics Engineers, New York, New York (Nov. 2011).

"Object-relational mapping," Retrieved from the internet: https://en.wikipedia.org/wiki/Object-relational_mapping, pp. 1-3 (Nov. 3, 2020).

"Hibernate," Retrieved from the internet: http://hibernate.org/, Total 1 page (Nov. 3, 2020).

"GreenDAO: Android ORM for your SQLite database," Retrieved from the internet: http://greenrobot.org/greendao/, pp. 1-2 (Nov. 3, 2020).

"Room Persistence Library," Retrieved from the internet: https://developer.android.com/topic/libraries/architecture/room.html, pp. 1-2 (Nov. 3, 2020).

"Core Data," Retrieved from the internet: https://developer.apple.com/documentation/coredata, pp. 1-4 (Nov. 3, 2020).

"Java Native Interface," Retrieved from the internet: https://en.wikipedia.org/wiki/Java_Native_Interface, pp. 1-3 (Nov. 3, 2020).

"Android.database.sqlite," Retrieved from the internet: https://developer.android.com/reference/android/database/sqlite/package-summary.html, pp. 1-3 (Nov. 3, 2020).

Allen et al., "The Definitive Guide to SQLite, Second Edition," Apress, pp. 1-347 (2010).

"Data Binding Library," Retrieved from the internet: https://developer.android.com/topic/libraries/data-binding/index.html, pp. 1-3 (Nov. 3, 2020).

"OpenAPI Initiative," Retrieved from the internet: https://www.openapis.org/, pp. 1-2 (Nov. 3, 2020).

Slesarenko et al., "First-class Isomorphic Specialization by Staged Evaluation," WGP'14: Proceedings of the 10th ACM SIGPLAN workshop on Generic programming, pp. 35-46, Gothenburg, Sweden (Aug. 2014).

Romanov "Generic construction of data converters," Retrieved from the internet: https://github.com/scalan/scalan/blob/master/core/src/main/scala/scalan/Converters.scala#L 15, pp. 1-4 (Dec. 15, 2016).

Kennedy et al., "Pocket Data: The Need for TPC-MOBILE," Technology Conference on Performance Evaluation and Benchmarking, TPCTC 2015, LNCS 9508, pp. 8-25, Springer International Publishing Switzerland (2016).

* cited by examiner

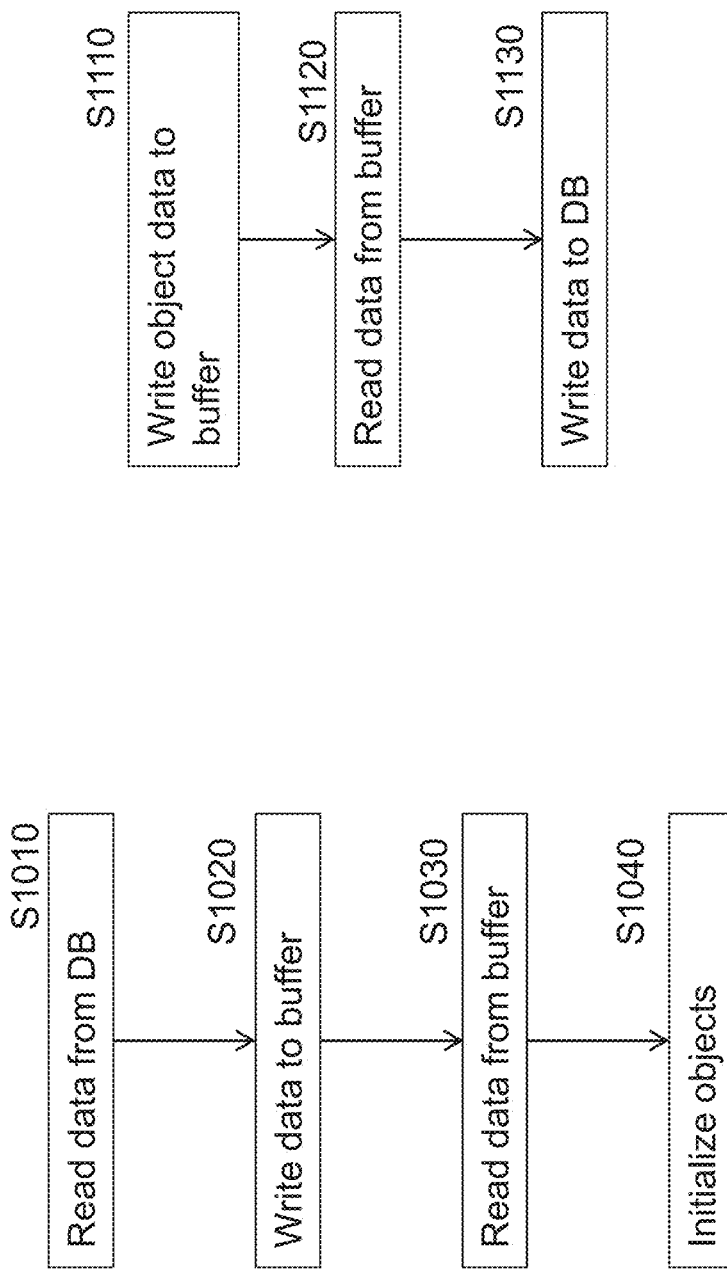

```
257  257      int sqlite3BtreeLast(BtCursor*, int *pRes);
     258  -   int sqlite3BtreeNext(BtCursor*, int *pRes);
     258  +   int INTERNAL_API(BtreeNext)(BtCursor*, int *pRes);
259  259      int sqlite3BtreeEof(BtCursor*);
260  260      int sqlite3BtreePrevious(BtCursor*, int *pRes);
     261  -   int sqlite3BtreeKeySize(BtCursor*, i64 *pSize);
     261  +   int INTERNAL_API(BtreeKeySize)(BtCursor*, i64 *pSize);
262  262      int sqlite3BtreeKey(BtCursor*, u32 offset, u32 amt, void*);
```

Fig. 12A

```
25
26   +#define INTERNAL_API(x) sqlite3##x
27   +
28    /*
29    ** Include the header file used to customize the compiler options for MSVC.
```

Fig. 12B

```
public class SqliteJni {
    _instance = new SqliteJni();
    SqliteJni() {
        System.loadLibrary("directsqlite");
    }
    native long prepare(
        long conn,
        String sql);
    native ByteBuffer moveNext(
        long cursor,
        boolean withRowid);
}
```

```
...
JNIEXPORT jobject
Java_com_huawei_aspen_data_store_sqlite_SqliteJni_moveNext(
    JNIEnv *env, jobject self,
    jlong handle, jboolean withRowid)
{
    ...
    sqlite3BtreeNext(
        c, &cursor->res)
    ...
}
...
```

```
#define INTERNAL_API(x) \
    sqlite3##x
...
int INTERNAL_API(BtreeNext)
(BtCursor*, int *pRes)
{
    ...
};
...
```

Fig. 13A

| Operation | SELECT | INSERT | UPSERT | UPDATE | DELETE | Total |
|---|---|---|---|---|---|---|
| Count | 33,470,310 | 1,953,279 | 7,376,048 | 1,041,967 | 1,248,594 | 45,090,798 |
| Runtime (ms) | 1.13 | 2.31 | 0.93 | 6.59 | 3.78 | |
| | | | Features Used | | | |
| OUTER JOIN | 391,052 | | | | 236 | 391,288 |
| DISTINCT | 1,888,013 | | | 25 | 5,586 | 1,893,624 |
| LIMIT | 1,165,096 | | | | 422 | 1,165,518 |
| ORDER BY | 3,168,915 | | | | 194 | 3,169,109 |
| Aggregate | 638,137 | | | 25 | 3,190 | 641,352 |
| GROUP BY | 438,919 | | | 25 | | 438,944 |
| UNION | 13,801 | | | | 65 | 13,866 |

Fig. 23

| Sqlite queries during 30 sec of boot | Count (1) | Time spent, ms (2) | Optimized time, ms (3) = (2) / 3.5 | Time Savings, ms (2) – (3) |
|---|---|---|---|---|
| All queries | 988 | 6103 | 1743,71 | 4359,3 |
| All SELECT quereies | 275 | 2235 | 638,571 | 1596,4 |
| SELECT ... FROM <table> | 56 | 303 | 86,5714 | 216,43 |
| SELECT ... FROM <table> WHERE ... | 156 | 1375 | 392,857 | 982,14 |
| SELECT ... FROM <table> WHERE ... ORDER BY ... | 43 | 313 | 89,4286 | 223,57 |
| SELECT ... FROM <table> WHERE ...GROUP BY ... | 3 | 26 | 7,42857 | 18,571 |
| SELECT ... FROM <table> JOIN ... | 9 | 63 | 18 | 45 |
| Other queries | 446 | 1788 | 510,857 | 1277,1 |

| | Total time | DB read time | Optimized read time | Time savings |
|---|---|---|---|---|
| Boot time,sec | 30 | 6,10 | 1,74 | 4,36 |
| One month of daily usage, hours | 16,9 | 10,5 | 3 | 7,5 |

Fig. 24

```
public class TpchFacade {
    private final TpchApi _data; // data access API generated from data model public TraverseResult traverseCustomers() {
        TraverseResult res = new TraverseResult();
        for (Customer c : _data.getAllCustomer()) {   // iterate over objects
            processCustomer(c, res);
        }
        return res;
    } public void processCustomer(Customer c, TraverseResult res) {
        double total = 0.0;
        for (Orders o : c.getOrders()) {
            if (o.getRegion().getName() != "China") continue;
            for (Lineitem l : o.getLineitem()) {
                total += l.getPrice() * l.getAmount();
            }
        }
        res.total += total;
    }
}
```

Fig. 25

SYSTEM AND A METHOD OF FAST JAVA OBJECT MATERIALIZATION FROM DATABASE DATA

CROSS-REFERENCE TO RELATED APPLICATIONS

This application is a continuation of International Application No. PCT/RU2018/000232, filed on Apr. 12, 2018, the disclosure of which is hereby incorporated by reference in its entirety.

TECHNICAL FIELD

Embodiments of the present application relate to a system and method for efficient materialization of objects from database data.

BACKGROUND

The embodiments of the invention are related to the field of computer software engineering, application servers and database systems, and are particularly related to a system and method for efficient materialization of Java objects from database data, which is required in implementations of ORM (object-relational mapping).

There are many existing ORM solutions for Java in general (for example "Hibernate", further details available online at http://hibernate.org/) and for Android in particular (for instance, "GreenDAO", see FIG. 1A further details available online at http://greenrobot.org/greendao/or "Room Persistence Library", further details available online at https://developer.android.com/topic/libraries/architecture/room.html). There are also ORMs for other platforms such as, for example, Apple CoreData (see FIG. 1B), which provides object graph management and persistence. Further details are available online at https://developer.apple.com/documentation/coredata. The importance of such mapping is also recognized by Google providing Room persistence API in a recently announced Android O.

A typical role of an ORM system is shown in FIG. 1A, where greenDAO represents an ORM system mediating between the database and the objects. In the figure, the database is represented by a Sqlite (or "SQLite") database, and as exemplary data objects, Java objects are shown. The goal of ORM is to provide data transfer between rows of the database and Java objects in memory. Different mapping strategies (class per table, class per hierarchy, etc.) are used in order to establish a relationship between database tables and Java objects.

One example of the "class per table" mapping strategy is shown in FIG. 2. A where the tables correspond to SQL (Structured-query language) tables. SQL is a high level non-procedural query language for relational databases. On the left-hand side of the figure, a database schema containing two tables, "Supplier" (having two columns, "id" and "address") and "Order" (having three columns, "name", "price", and "supplierId"), is shown. On the right-hand side, the mapping between the tables and respective corresponding Java objects which represent data from the tables is shown by means of database table definitions and Java class definitions. In particular, it can be seen that SQL tables correspond to a Java classes, columns correspond to data fields (i.e. attributes/properties) of the classes. Not shown in FIG. 2A is the correspondence between rows of a table and data objects (i.e. the instances of a class). An extended object relational mapping example is shown in FIG. 2B.

Interoperation (in particular data access) between Java application and DBMS can be either inter-process or intra-process, depending on whether the application (or app) and the DBMS have their own operating system processes, respectively, or they share the same process i.e. one common process in which both the app and the DBMS are operated.

The difference between inter-process and intra process data access (also referred to as "interop") is shown in FIG. 3. As can be seen, in the case of inter-process interoperation, there are two separate operating system processes: the application process by which the Virtual Machine (VM) is run, and the DBMS process by which the DBMS row buffer is run. Inter-process interop is performed by serialization and deserialization. In the case of intra-process interop, both the VM and the DBMS row buffer are executed in the application process.

When the DBMS is implemented as a native component (e.g. using C/C++) and is executing in the same process with an application JVM (Java Virtual Machine), a mechanism for interaction between Java (i.e. the part of the process within the Virtual Machine) and the Native part of the process is to use JNI (Java Native Interface). In this context, JNI can be used to invoke (call) public API functions of the DBMS, which is loaded into the application process as a dynamically linked library. This method can be used in an Android data access layer for the Sqlite Package android.database.sqlite, further information available online at https://developer.android.com/reference/android/database/sqlite/package-summary.html.

FIG. 4 shows a data transfer pipeline in a typical ORM. Shown in the figure is an application Process, which contains a Java VM and a Sqlite DBMS.

SUMMARY OF THE INVENTION

Systems and methods are proposed to significantly accelerate creation of Java object and initialization of the objects from database.

Exemplary methods and systems are provided in the description which follows.

According to an aspect, an apparatus is provided for extracting data from a database. The apparatus comprises a database interface configured to enable communication with the data, a virtual machine (VM), a buffer comprising a plurality of memory regions, a data extraction kernel on the native side, and an object initialization kernel on the VM-side. The data extraction kernel comprises a native-side buffer application programming interface (API), and is configured to read database data from a plurality of locations in the database using the database interface and write the database data to the buffer using the native-side buffer API, the database data corresponding to a query result. The object initialization kernel comprises a VM-side buffer API and is configured to read the database data from the buffer using the VM-side buffer API and to initialize a plurality of objects with the database data read from the buffer. Information indicating one of the plural memory regions in the buffer where the data extraction kernel writes the database data is known to the native-side buffer API and to the VM-side buffer API.

This provides the advantage that fast object initialization based on database data is enabled.

According to some embodiments, the data extraction kernel comprises a native-side multi-cursor to extract the database data from the database, the native-side multi-cursor comprising a plurality of cursors. The object initialization kernel comprises a VM-side multi-cursor to extract the database data from the buffer, the VM-side multi-cursor comprising a plurality of cursors. A cursor of the native-side multi-cursor is configured to iterate over items of the database data in one of the plural locations in the database independent of the locations of the other cursors of the native-side multi-cursor. A cursor of the VM-side multi-cursor is configured to iterate over items of the database data synchronously with the iteration of the cursor of the native-side multi-cursor.

This provides the advantage that database regions can be traversed in a coordinated way when extracting database data for object initialization.

For instance, said cursor of the VM-side multi-cursor is configured to pass an iteration call to said cursor of the native-side multi-cursor, and said cursor of the native-side multi-cursor is configured to perform, upon reception of the iteration call, a cursor step synchronously with the VM-side database cursor by reading an item of the database data from the database and writing the item of the database data to the buffer.

This provides the advantage that a fast and efficient data pipeline from the database to the VM can be implemented.

In an example, the plurality of memory regions are located on the native side; the VM-side buffer API comprises a direct buffer on the VM-side, said cursor of the native-side multi-cursor is further configured to pass, upon reception of the iteration call, the location of the one of the plural memory regions to the direct buffer, and the object initialization kernel is configured to obtain the database data for initializing the objects by accessing the direct buffer.

This provides the advantage of allowing the VM-side to practically obtain the data from the memory regions of the buffer.

In another example, the plurality of memory regions are located on the native side, said cursor of the native-side multi-cursor is further configured to create, upon reception of the iteration call, a new direct buffer in the VM-side buffer API and to pass a direct address of the one of the plural memory regions via the buffer API to the direct buffer, and the object initialization kernel is configured to obtain the database data for initializing the object by accessing the direct buffer.

This provides the advantage that direct buffers for practically obtaining the data from the buffer memory regions can flexibly be allocated.

In a further example, the plurality of memory regions are located on the VM-side, and the data extraction kernel is configured to write the database data to the buffer via the native-side buffer API.

This provides the advantage of the virtual machine accessing the database data used for object initialization in an efficient way.

For instance, the object initialization kernel is configured to initialize an object of the plurality of objects with the database data within a cursor step for each cursor in the native-side multi-cursor.

This provides the advantage of coordinated and efficient object initialization from database data using pipelined cursors.

In some embodiments, the apparatus further comprises a kernel generator for generating the object initialization kernel and the data extraction kernel. The kernel generator is configured to generate the object initialization kernel based on a first isomorphism between respective object types of the plurality of objects and a data format of the region layout in the buffer and the data extraction kernel based on a second isomorphism between a data format of the database data in the database interface and the data format of the region layout in the buffer. The first isomorphism and the second isomorphism are input to the kernel generator, the isomorphisms being data structures representing program code.

This provides the advantage that the data extraction kernel and the object initialization kernel can be provided with corresponding mappings between database and buffer and, respectively, buffer and data objects.

For example, a data model, an object-relational mapping (ORM), a data access application programming interface (API), a definition of the native-side buffer API and/or a definition of the VM-side buffer API are further input to the kernel generator.

For instance, the kernel generator generates the object initialization kernel and the data extraction kernel dynamically at runtime.

This provides the advantage of temporal flexibility of object initialization during operation of the apparatus.

For instance, the object is a Java object and the VM is a Java VM.

This provides the advantage of compatibility with well-established technology.

According to another aspect, an apparatus is provided for writing data to a database. The apparatus comprises a database interface configured to enable communication with the database, a virtual machine, VM, a buffer comprising a plurality of memory regions, an object processing kernel on the VM-side, and a data writing kernel on the native side. The object processing kernel comprises a VM-side buffer application programming interface, API, and is configured to write object data from a plurality of objects to the buffer using the VM-side buffer API. The data writing kernel comprises a native-side buffer application programming interface, API, and is configured to read the object data from the buffer using the native-side buffer API and write the object data to a plurality of locations in the database using the database interface. Information indicating one of the plural memory regions in the buffer where the object processing kernel writes the object data is known to the native-side buffer API and to the VM-side buffer API.

This provides the advantage of fast data transfer from VM objects to a database.

According to a further aspect, a method is provided for extracting data from a database. The method comprises the steps of reading database data from a plurality of locations in the database using a database interface, the database data corresponding to a query result, writing the database data to a buffer comprising a plurality of memory regions using a native-side buffer application programming interface, API, reading database data from the buffer using a virtual machine, VM-side buffer API, and initializing a plurality of objects with the database data read from the buffer. Therein, information indicating one of the plural memory regions in the buffer where database data is written known to the native-side buffer API and to the VM-side buffer API.

For instance, the step of extracting data from the database includes iteration of a cursor from among a plurality of cursors comprised by a native-side multi-cursor over items of the database data in one of the plural locations in the database independent of the locations of the other cursors of the native-side multi-cursor, and the step of reading the database data from the buffer comprises iteration by a cursor from among a plurality of cursors comprised by a VM-side multi-cursor over items of the database data synchronously with the iteration of the cursor of the native-side multi-cursor.

For instance, the iteration of said cursor of the VM-side multi-cursor includes passing an iteration call to said cursor of the native-side multi-cursor, and the iteration of said cursor of the native-side multi-cursor includes performing, upon reception of the iteration call, a cursor step synchronously with the VM-side database cursor by reading an item of the database data from the database and writing the item of the database data to the buffer.

In an example, the iteration of said cursor of the native-side multi-cursor further comprises passing, upon reception of the iteration call, the location of the one of the plural memory regions to a direct buffer comprised by the VM-side buffer API on the VM-side, the plurality of memory regions being located on the native side, and the iteration of said cursor of the VM-side buffer API comprises obtaining the database data for initializing the object by accessing the direct buffer.

In another example, the iteration of said cursor of the native-side multi-cursor further comprises creating, upon reception of the iteration call, a new direct buffer in the VM-side buffer API and passing a direct address of the one of the plural memory regions via the buffer API to the direct buffer, and the iteration of said cursor of the VM-side buffer API comprises obtaining the database data for initializing the object by accessing the direct buffer.

In a further example, the plurality of memory regions are located on the VM-side, and the database data is written to the buffer via the native-side buffer API.

In some embodiments, an object of the plurality of objects is initialized with the database data within a cursor step for each cursor in the native-side multi-cursor.

In some embodiments, the method for extracting data from a database further comprises generating the object initialization kernel based on a first isomorphism between respective object types of the plurality of objects and a data format of the region layout in the buffer and generating the data extraction kernel based on a second isomorphism between a data format of the database data in the database interface and the data format of the region layout in the buffer, wherein the first isomorphism and the second isomorphism are input for the generation of the data extraction kernel and the object initialization kernel, and the isomorphisms are data structures representing program code.

For example, a data model, an object-relational mapping (ORM), a data access application programming interface, API, a definition of the native-side buffer API and/or a definition of the VM-side buffer API are further input for the generation of the data extraction kernel and the object initialization kernel.

For instance, the object initialization kernel and the data extraction kernel are generated dynamically at runtime.

In some embodiments, the plurality of objects are Java objects and the VM is a Java VM.

In a further aspect, a method is provided for writing data to a database. The method comprises the steps of writing object data from a plurality of objects to a buffer comprising a plurality of memory regions using a virtual machine, VM-side buffer application programming interface, API, reading the object data from the buffer using a native-side buffer API, and writing the object data to a plurality of locations in the database using the database interface, wherein information indicating one of the plural memory regions in the buffer where the object data is written is known to the native-side buffer API and to the VM-side buffer API.

Moreover, a computer readable medium is provided storing instructions causing a computer to perform the aforementioned method for extracting data from the database or the aforementioned method for writing data to a database.

Details of one or more embodiments are set forth in the accompanying drawings and the description below. Other features, objects and advantages will be apparent from the description, drawings and claims.

SHORT DESCRIPTION OF THE DRAWINGS

In the following embodiments of the invention are described in more detail, with reference to the attached figures and drawings, in which:

FIG. 10 is a flow chart of a method for extracting data from a database;

FIG. 11 is a flow chart of a method for writing data to a database;

FIG. 12A is a definition in Sqlite to support a method of the present disclosure;

FIG. 12B is a definition in Sqlite to support a method of the present disclosure;

FIG. 13A is an example of code fragments of a data transfer pipeline;

FIG. 23 is a table of Types and numbers of SQL statements executed during one month of typical usage, and query features used in each statement;

FIG. 24 is a table of statistics of database usage during the boot; and

FIG. 25 is a code example of code for cross-platform code.

DETAILED DESCRIPTION

Figure 1B:
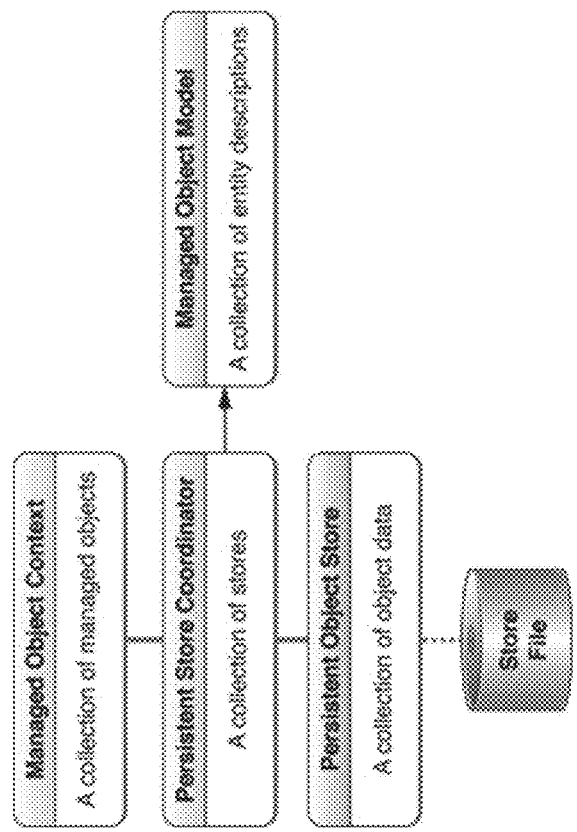
FIG. 1B is a flow chart of an exemplary object graph management system.
Figure 1A:
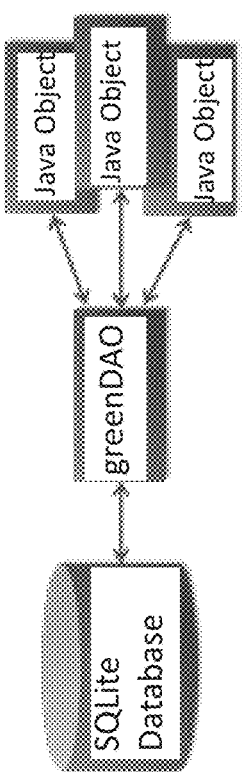
FIG. 1A is a schematic drawing of an exemplary ORM system.
Figure 2A:
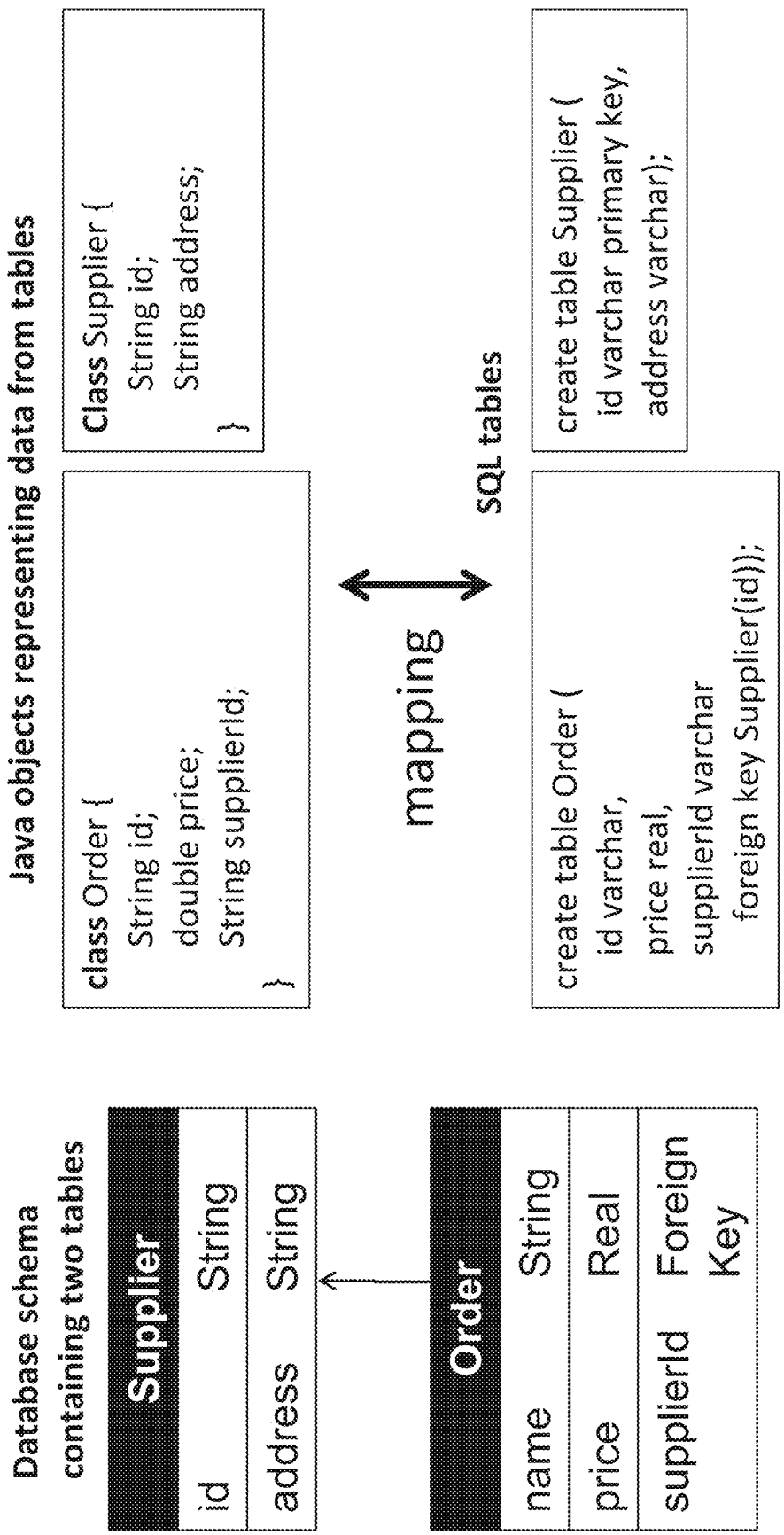
FIG. 2A is a diagram showing an example of a mapping between database tables and data objects.
Figure 2B:
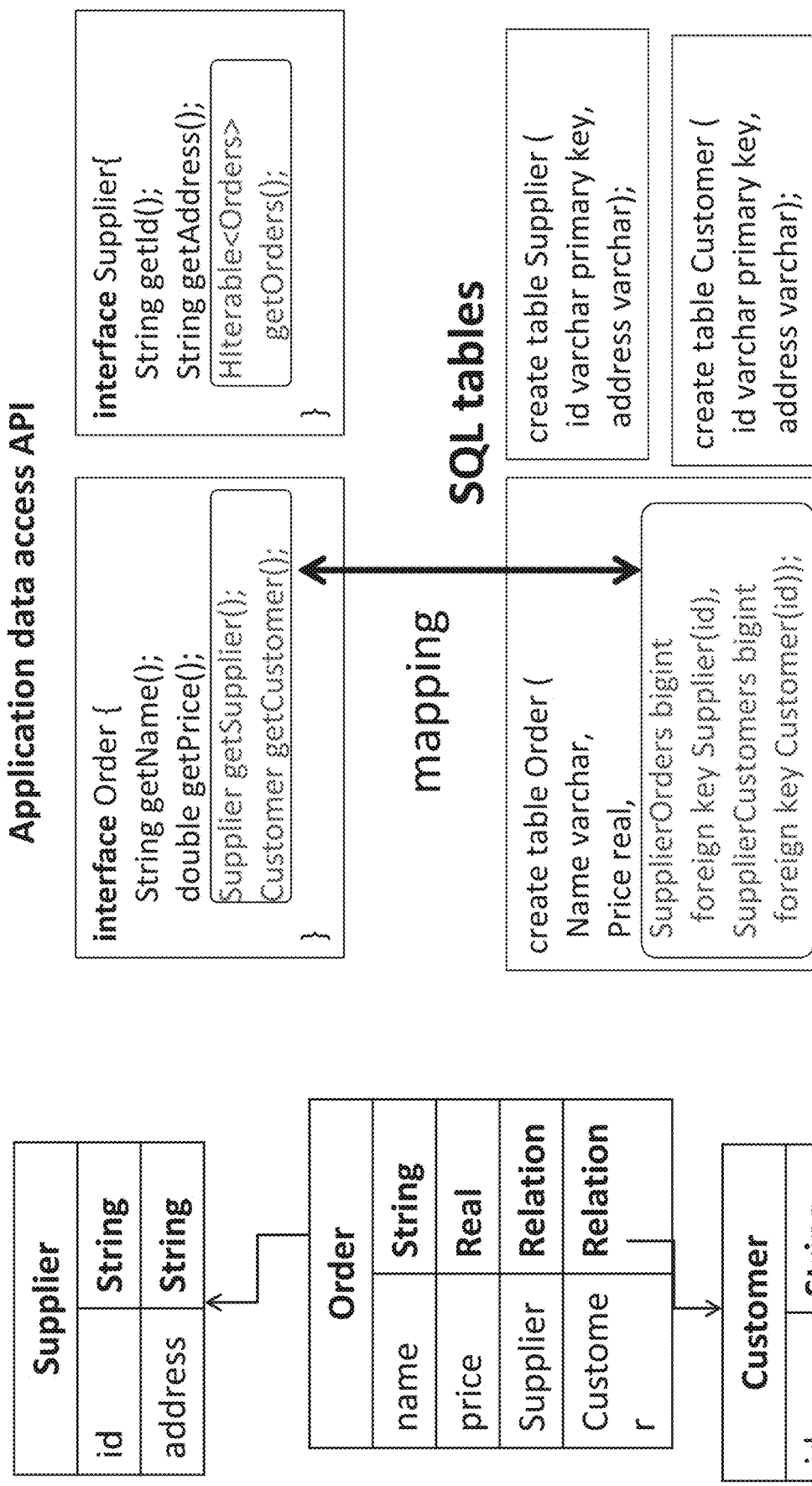
FIG. 2B is a diagram showing a further example of a mapping between database tables and data objects.
Figure 3:
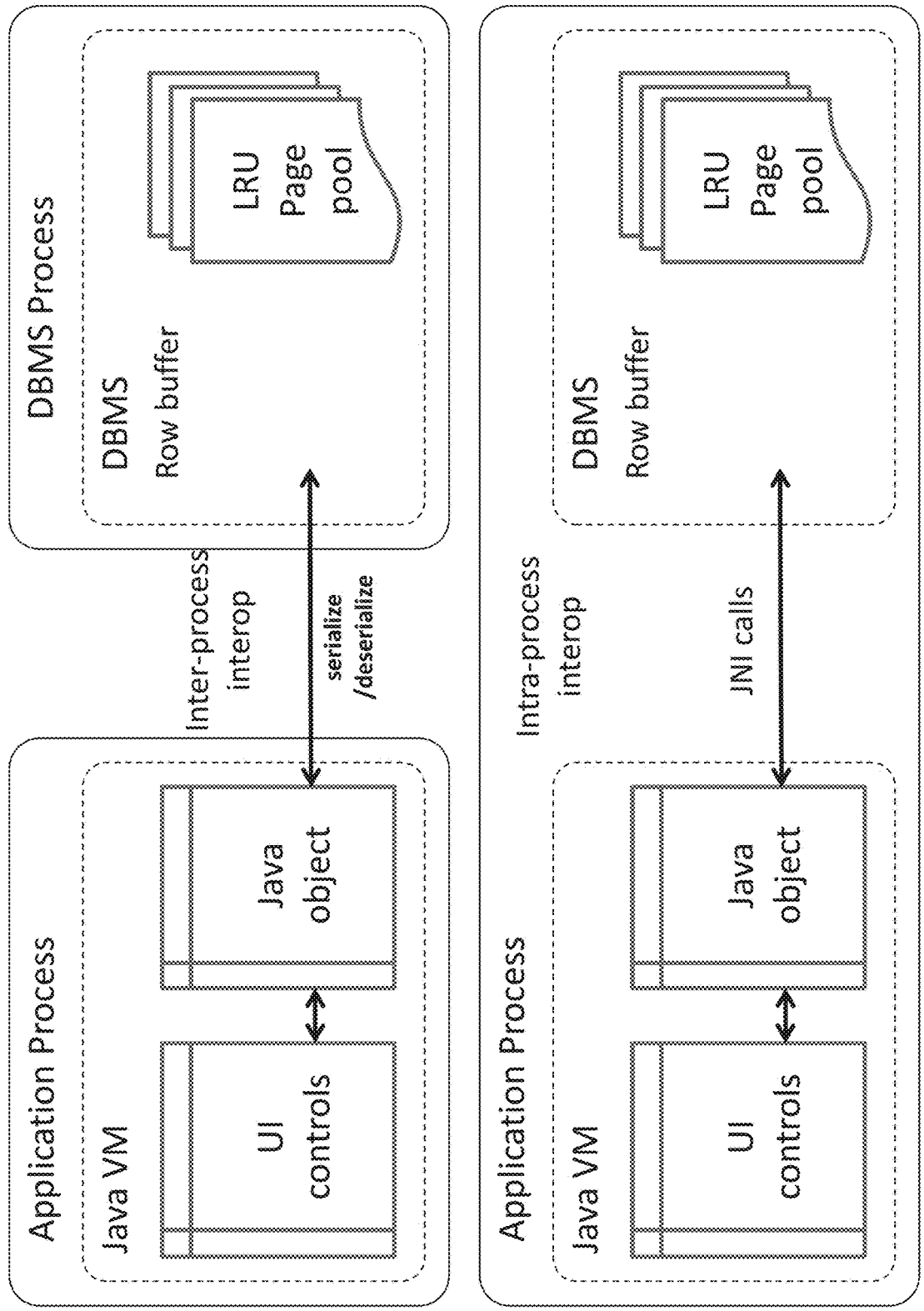
FIG. 3 is a block diagram showing inter-process and intra-process data access.

This disclosure is related to an execution environment where a VM (such as a JVM) and a DBMS share the same Application Process of the operating system, as it is shown in FIG. 3. (intra-process interop).

Figure 5:
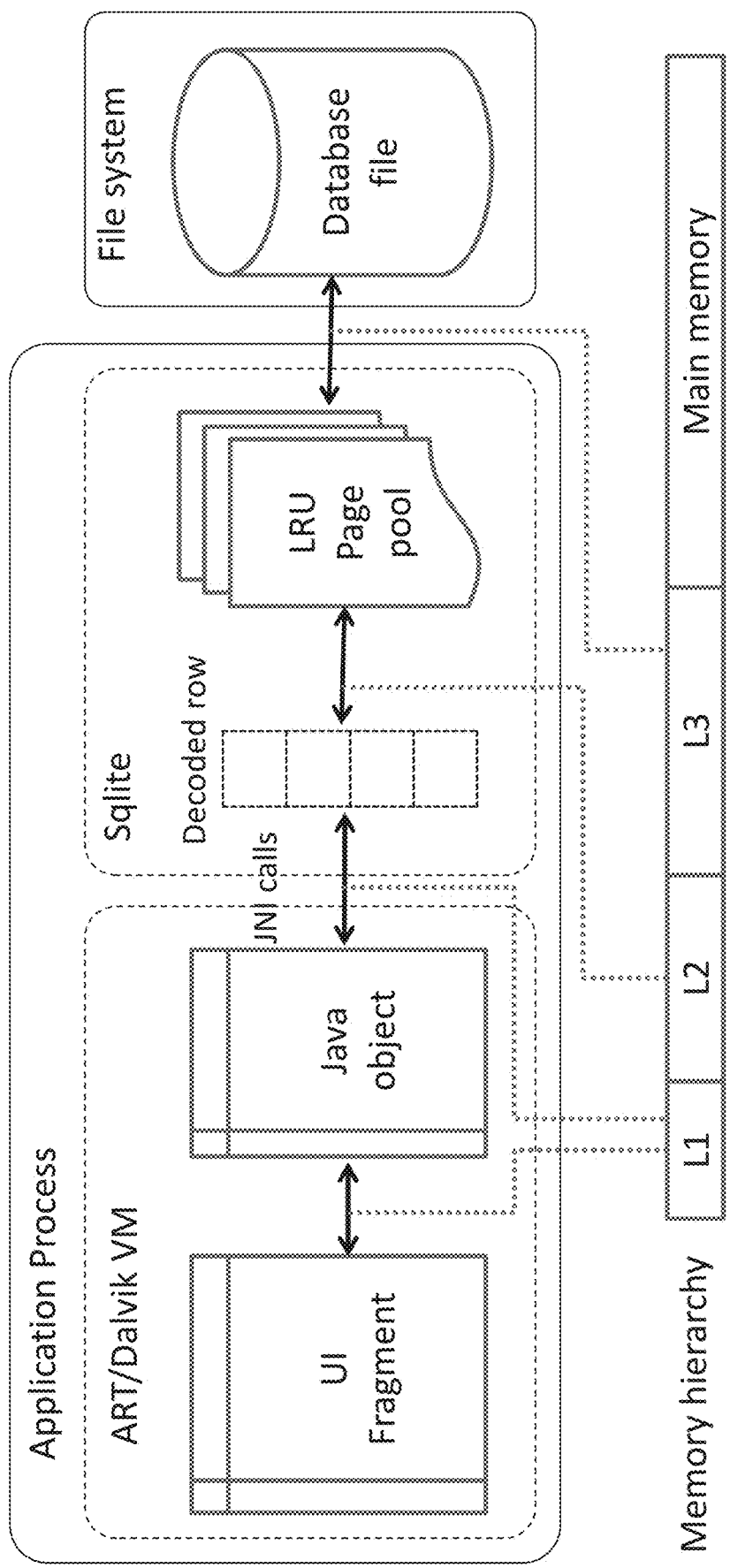
FIG. 5 is a block diagram showing an exemplary data extraction path from a database to a user interface.
Figure 6:
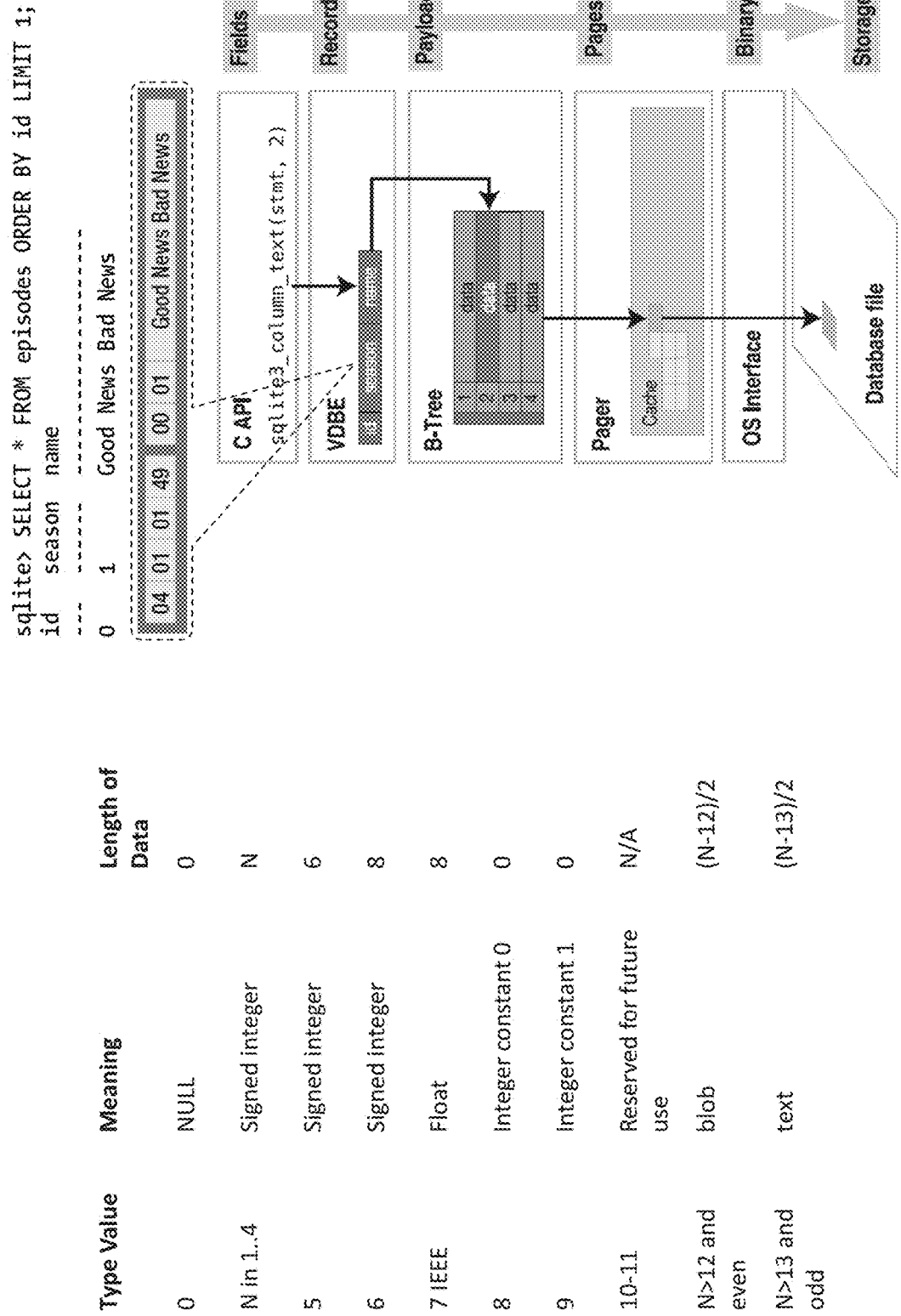
FIG. 6 is a table block diagram showing an exemplary data layout of a database management system.

In order to be materialized as Java object(s), database data may need to be transferred through many layers of software stack, which is illustrated in FIG. 5. For instance, as can be seen from the figure, the following steps may need to be performed:

1) A data page is read from the database file and put into memory (in the page pool, e.g. LRU (last recently used) page pool).
2) Row data should be located in the page by following indexes and/or other navigational data structures of the DBMS. A data layout example in SQLite is illustrated in FIG. 6. Further, example data layout in Sqlite can be found in more detail in G. Allen and M. Owens, "The Definitive Guide to SQLite (second edition)," Apress, 2010, pp. 303-308.
3) Row data should be decoded from the DBMS internal format to the format of the DBMS public API (application programming interface), this decoded information is represented in FIG. 5 by the "Decoded row" block.
4) Decoded data should be converted to the format of Java types and transferred to Java memory space.
5) Java object should be created and its fields initialized using transferred data
6) UI (user interface) components are bound to the Java object either by copying data for Java object fields or by using Data Binding Library (more details on the Data Binding Library available online at: https://developer.android.com/topic/libraries/data-binding/index.html)

The performance of this data transfer process is mostly memory bound, thus implementation should take memory hierarchy (in particular caches, L1, L2, L3, . . . ) into consideration.

Moreover, on mobile hardware (such as mobile phones or tablet computers), hardware performance is bound by memory access. Thus, both temporal and spatial cache locality is desirable. The data transfer should be pipelined so that the buffer created on each layer should be immediately accessed downstream.

The above steps 1) to 3) are performed by DBMS when, for example, database cursor moves to the next row and values of all columns are retrieved. This is demonstrated by listing shown in the following code fragment for the Extraction of data from Sqlite row using the public API:

```
if (sqlite3_step(cursor->stmt) == SQLITE_ROW) {
    int count = sqlite3_column_count(cursor->stmt);
    for (int i = 0; i < count; i++) {
        int type = sqlite3_column_type(cursor->stmt, i);
        switch (type) {
```

-continued

```
            case SQLITE_INTEGER:
                *(sqlite3_int64*)cursor->out.append(8) =
                    sqlite3_column_int64(cursor->stmt, i);
                continue;
            case SQLITE_FLOAT:
                *(double*)cursor->out.append(8) =
                    sqlite3_column_double(cursor->stmt, i);
                continue;
            ...
        }
    }
}
```

In the code fragment, the operations beginning with "sqlite_" belong to the Sqlite public API. This example code also shows that extracted (decoded) data is appended to output buffer data structure associated with the cursor. Such a code fragment for the extraction of data from a DBMS such as Sqlite will also be referred to as in the following as an Extract Kernel.

Corresponding to the Extract Kernel there should be another code fragment shown in the following, which performs reading of decoded data from the buffer associated with the cursor and transfer it to the fields of Java object:

```
public initCustomer(Customer c, Cursor cur) {
    c.id = cur.getInt(1);
    c.name = cur.getString(2);
    c.age = cur.getInt(4);
}
```

In other words, the latter code fragment performs materialization or initialization of a Java object. Such a code fragment for object initialization will also be referred to as InitKernel.

The present disclosure provides a new system and method for transferring data from a database and materializing them as data objects such as Java objects. Therein, an apparatus for an implementation of ORM in order to establish cache efficient data transfer between DBMS and Java is provided. Further, methods of implementation of data transfer code (code kernels) which are simple to develop/support and also highly efficient at runtime are described.

Figure 4:
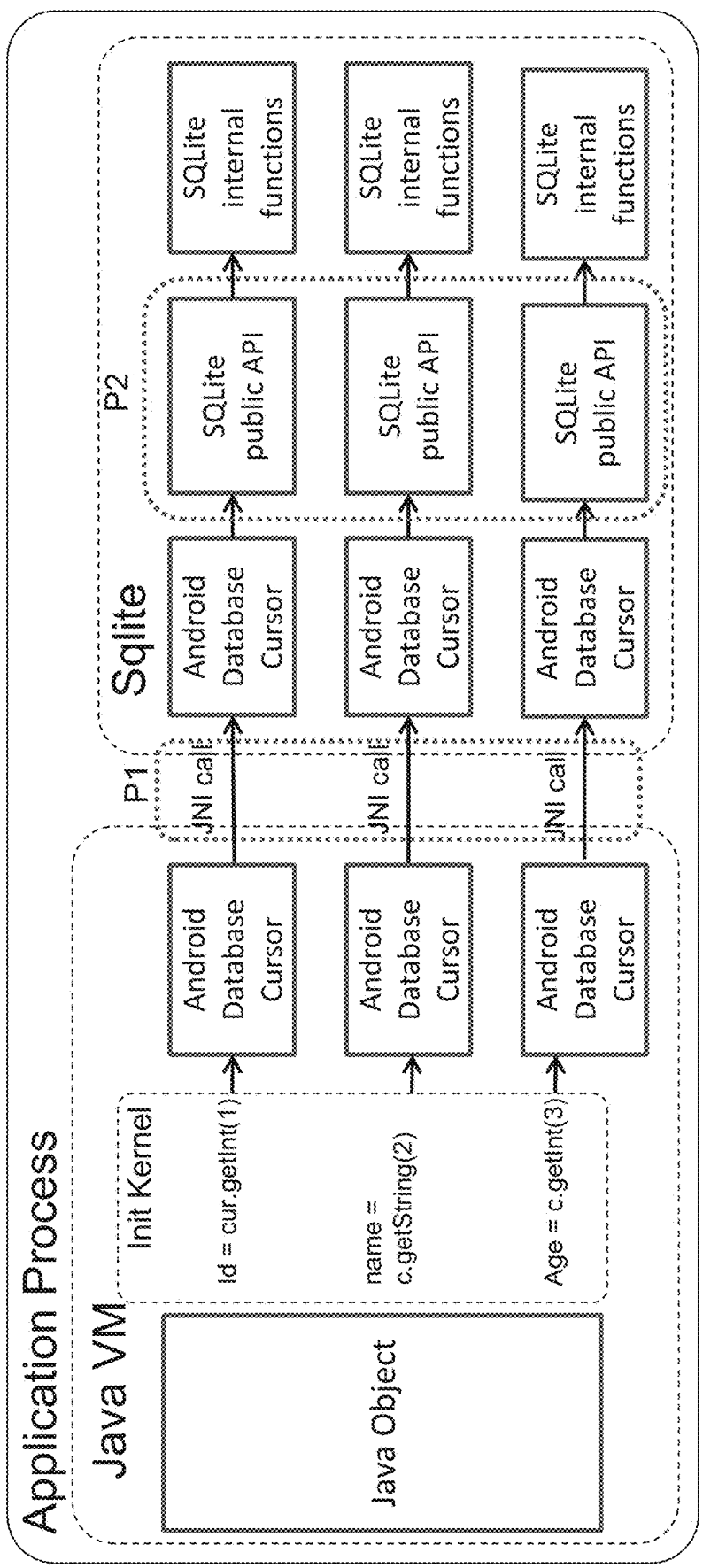
FIG. 4 is a block diagram showing a data transfer pipeline in an object relational mapping.

In an ORM such as, for example, greenDAO, an Init Kernel code fragment as shown above is generated based on the table-to-class mapping configuration. When, in a data transfer pipeline of a typical ORM shown in FIG. 4, InitKernel is executed, the data is requested from the cursor for each class field. Android Database Cursor, ADC, is a Java class implemented in package android.database.sqlite of Android SDK. It is paired with corresponding ADC Native side object implemented in C++ and residing in native library linked with Sqlite's public API.

Two types of cursor operations are relevant to this disclosure:

1) moveNext operation moves the cursor one step forward to the next row of the query result set; and
2) getXXX set of operations which extract field values from the current row of the result set.

In actual implementation of android.database.sqlite, the rows of the database are extracted by chunks, and each chunk is put in memory buffer. Native side ADC is moving over the current chunk, and when the chunk is done, it retrieves the next chunk from the database and then moves to the first row of the new chunk.

During retrieval of the next chunk the following steps are performed:
for each database row, which is loaded into the chunk, and for each column of the row:
1) Native ADC uses related Sqlite statement and invokes Sqlite API methods to extract column data from the database;
2) Sqlite API function uses internal Sqlite API in order to access and decode column data and put it in the format of public Sqlite API;
3) Native ADC accepts decoded column data and saves it in chunk buffer managed by Native Android Database library, performing data conversion to the format of the chunk buffer.

During execution of InitKernel, for each column of the table mapped to Java class the following steps are performed:
1) The method of Android Database Cursor, ADC, on Java side is invoked, which in turn invokes, using JNI, the corresponding method of Android Database Cursor on Sqlite side (native side).
2) Native ADC either extracts column value from chunk buffer, or advances data extraction to the next chunk and then extracts column value.

The following design features of typical implementations lead to sub-optimal performance of the data transfer pipeline:
Excessive JNI calls are performed on each column access. Although rows are chunked at Native ADC side, JNI calls are still performed to access chunked data and transfer them to Java memory space.
Data values are decoded from an internal Sqlite representation to a public Sqlite representation and then immediately transformed into an internal representation of the chunk buffer for subsequent transfer to Java (during JNI calls).
Data is transferred to (Java) VM memory space column by column, this decreases temporal cache locality.
Linearization of row data in a single byte array (for more detail, see A. Shivarudraiah and E. Shirk, "System and method for marshaling massive database data from native layer to java using linear array". U.S. Pat. No. 9,600,546 B2, 21 Mar. 2017) and copying of this array to Java/VM side has at least two negative effects on performance: 1) additional data copying increases cache misses; 2) liner buffer is suboptimal for column-based data storages.

Based on these performance issues of typical implementations, the present disclosure aims at providing a system for an implementation of ORM in order to establish both memory-efficient data transfer and CPU-efficient control transfer between DBMS and VM/Java. In particular, a VM-side database cursor should be pipelined with a native-side Database Cursor, which makes the data transfer cache efficient and can reduce cache misses. The Native-side Database Cursor may further advantageously be configured to create DirectByteBuffer objects at Java side. DirectByteBuffer objects should be directly accessible by Java code to facilitate inlining and JIT (just in time) compiler optimizations.

A further objective is to describe a method of implementation of data transfer code (code kernels) which is: 1) simple to use (develop/support); 2) flexible to support different DBMS and buffer data layouts; and 3) also highly efficient at runtime.

In the following, a general aspect of the present disclosure will be described with reference to FIG. 7.

According to a general aspect, the present disclosure provides an apparatus for extracting data from a database. The apparatus comprises a database interface which is configured to enable communication with the database, and further comprises a virtual machine (VM) 710 and a buffer 770 comprising a plurality of memory regions. Moreover, the apparatus for extracting data from a database table comprises a data extraction kernel 760 on the native side 750 and an object initialization kernel 720 on the VM-side 710. The data extraction kernel 760 comprises a native-side buffer application programming interface, API, and is configured to read database data from a plurality of locations in the database using the database interface and write the database data to the buffer 770 using the native-side buffer API. The database data corresponds to a query result. The object initialization kernel 720 comprises a VM-side buffer API to read the database data from the buffer 770 using the VM-side buffer API and to initialize a plurality of objects with the database data read from the buffer. Information indicating one of the plural memory regions in the buffer 770 where the data extraction kernel 760 writes the database data is known to the native-side buffer API and to the VM-side buffer API.

The database data which is extracted from the database corresponds to an instance of a query result which, in return, may comprise a set of instances. The instance of a query result may be composed of different items located in different database tables. Later, the instance of a query result corresponds to a VM object instance.

For example, the database tables may be organized in a master-detail relationship such as Order (master)-lineitem (detail), wherein a master item may be associated with a plurality of detail items. For example, an order table comprises a column "id" containing ID numbers of orders. In another table, "lineitem", several items may have the same order ID indicated by an entry in an "order id" column of the lineitem table and corresponding to an entry in the id column of the order table.

The present aspect of the disclosure covers the following ways of transferring information for each master item through the data pipeline (database->data extraction kernel->buffer->object initialization kernel->object):
1) Each master item is transferred in one single query, then, based on each master item, an individual query is made to extract the related detail items one by one.
2) Each master item is transferred in one single query, then, using one single VM-native roundtrip, all related detail items (i.e. detail items related to all master items) are extracted and held in a buffer which can hold many detail items at once.
3) A single master item and all related detail items are transferred by a single VM-native roundtrip by means of a correspondingly structured buffer.

The buffer contains a plurality of memory regions (or blocks). I.e. the buffer need not necessarily correspond to a linear array. In particular, some or all of the memory regions or blocks of the buffer may be adjacent (e.g. physically, logically and/or with respect to the memory allocation strategy) to one another, however, the buffer may also or alternatively contain one or more regions which are remote from other memory regions comprised by the buffer. I.e., the memory regions are not necessarily continuously allocated. They may be distributed within the memory which is possibly shared with other data. It is sufficient that the buffer is written into by the data extraction kernel and read by the object initialization kernel. No further access of the buffer is required.

Rather than a buffer being a linear array, the VM-side buffer API and the native side buffer API are used, wherein information indicating one of the plural memory regions where the database data is written is known to the buffer APIs on both sides. Data extraction Kernel and object initialization Kernel may agree (in their definition) on the structure of the Buffer, for instance on: a) how many rows are stored at any given time, b) what is the coordination control flow between VM and native parts c) what is lifecycle of each region of the buffer and where it is allocated. As will be described later in more detail, the common knowledge of data extraction kernel and object initialization kernel, i.e. their agreement on the buffer structure, may be established by way of the kernel generation.

The VM-side and the native side buffer API constitute implementations of a general buffer API. Accordingly, the general buffer API may encapsulate control flow transfer mechanisms between VM-side and native-side implementations of the buffer API. Depending on the implementation of the general buffer API, this buffer API may use different memory layouts (data formats) consisting of regions as well as a memory allocation strategy. For each specific memory layout of choice, there need to be at least a VM-side implementation (the VM-side buffer API) and a native-side implementation (the native-side buffer API) of the general buffer API. The disclosure is not limited to a particular region structure of the buffer, but rather provides the possibility of having an arbitrary buffer structure, in accordance with the general buffer API and its instantiations on the VM-side and on the native side. A memory region comprised by the buffer corresponds to a block of memory in a specific buffer implementation.

The data extraction kernel (Extract Kernel) and the object initialization kernel (Init Kernel) comprise, respectively, the buffer APIs (native side/VM-side). I.e., the data extraction kernel implements a native-side buffer API, and the object initialization kernel implements a VM-side buffer API. The data extraction kernel may extract data from several pointed locations in the database corresponding to different database items such as tables, views, queries etc. When data is moving from the native side to the VM, the buffer is written from the native side using native-side Buffer implementation. When object is initialized, the buffer is read from VM side using VM-side Buffer implementation.

Figure 7:
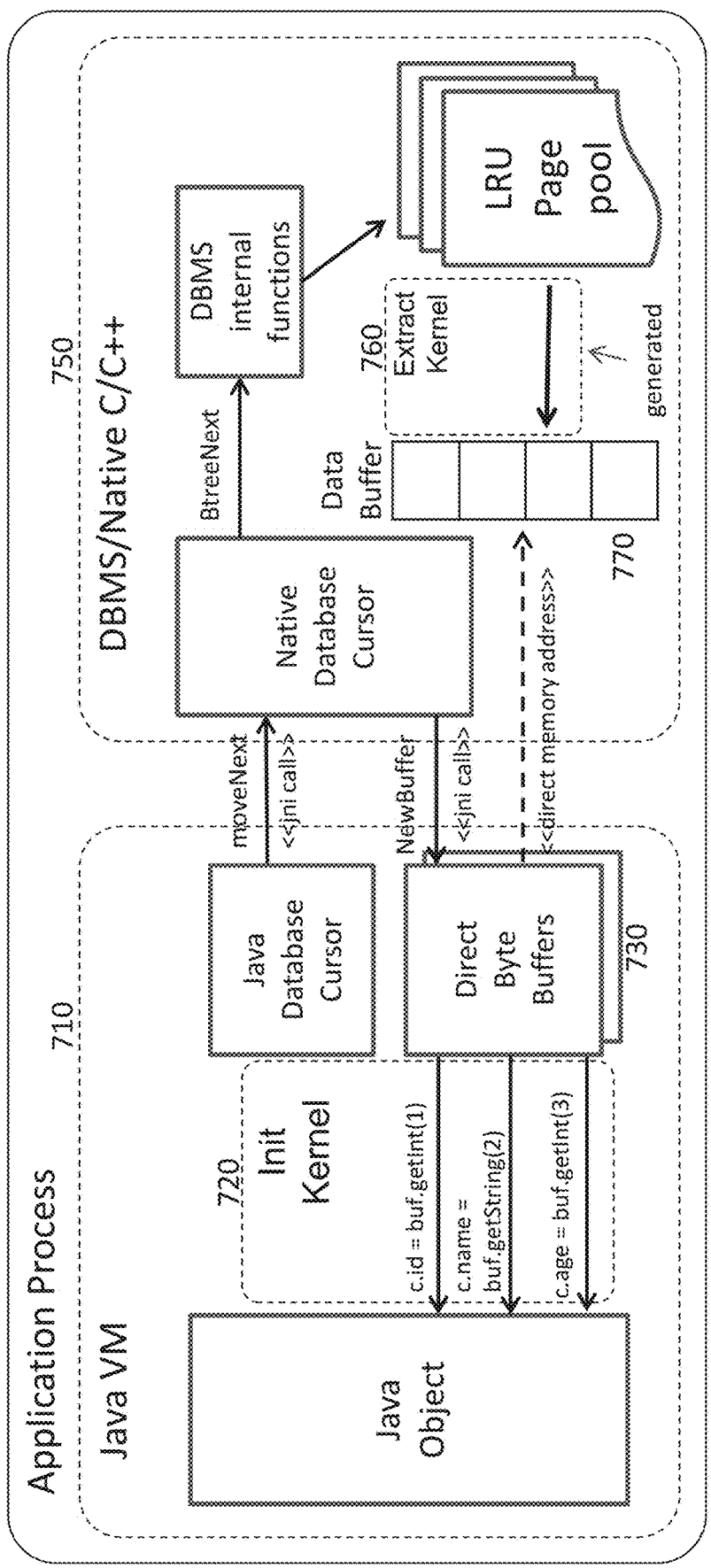
FIG. 7 is a block diagram of an apparatus for extracting data from a database.

Although in the above description, reference is made to FIG. 7, the present disclosure is not limited to the embodiment shown in the figure. The embodiment shown in FIG. 7 as well as further embodiments will be described below.

According to some embodiments, the data extraction kernel comprises a native-side multi-cursor to extract the data from the database. The multi-cursor comprises a plurality of cursors. Correspondingly, the object initialization kernel comprises a VM-side multi-cursor comprising a plurality of cursors to extract the database data from buffer. A cursor (i.e. at least one cursor) of the native-side multi-cursor is configured to iterate over items of the database data in one of the plural locations in the database independent of the locations of the other cursors of the native-side multi-cursor. A cursor (i.e. at least one cursor) of the VM-side multi-cursor is configured to iterate over items of the database data synchronously with the iteration the native-side cursor which is iterating independently.

In general, databases typically have a notion of cursor to traverse internal data structures, or other objects to represent data locations, depending on the specific data access API. According to the embodiments using a multi-cursor, rather than a single cursor, a set of cursors comprising a plurality of such database cursors (which may be regarded as "cursors in a bucket") may be kept, which traverse the database in a coordinated way. It has been observed that this may result in a performance improvement of up to 50% already with two coordinated cursors.

The term "multi-cursor" refers to a set of at least two cursors. In other words, a multi-cursor is a set of ordinary cursors. Each ordinary cursor can iterate respectively over a collection of items from the database (e.g. tables, views, queries) and extract the data from the corresponding pointed locations of the database. Moreover, each cursor in a multi-cursor can operate independently. For instance, a multi cursor may be used to implement all three extraction strategies for the master-detail relationship described above. In the example of the order-lineitem relationship, a multi-cursor comprises two cursors (i.e. a cursor for the orders and a cursor for the lineitems).

Having a multi-cursor accessing the database allows for implementing a plurality of data extraction strategies. In particular, plural VM objects may be initialized in a coordinated way. For the respective objects to be initialized, object-cursor mappings may be defined. Furthermore, pairs of pipelined cursors (a pair consisting of a VM-side cursor out of the VM-side multi-cursor and a native-side cursor out of the native-side multi-cursor) are defined. Accordingly, there are respective object-cursor mappings for the respective cursor pairs. The multi-cursors constitute an implementation of the agreement between object initialization kernel and data extraction kernel on the structure of the buffer, i.e. the common knowledge on where the database data is written in the buffer and read from.

For instance, the VM-side cursor described above comprised by the VM-side multi-cursor which iterates synchronously with the iteration of a cursor from among the cursors of the native side multi-cursor may be configured to pass an iteration call to the corresponding cursor of the native-side multi cursor. The cursor of the native-side multi-cursor is configured to perform, upon reception of the iteration call, a cursor step synchronously with the VM-side database cursor by reading an item of the database data from the database and writing the item of the database data to the buffer.

The present disclosure provides several possibilities with respect to the location of the memory regions of the buffer. In the following, two examples are provided where the memory regions are located on the native side.

Example a) The plurality of memory regions may be located on the native side. In this case, the VM-side buffer API may comprise a direct buffer on the VM side. The cursor of the native-side multi-cursor may be configured to pass, upon reception of the iteration call, the location of one of the plural memory regions to the direct buffer. The object initialization kernel may be configured to obtain the database data for initializing the objects by accessing the direct buffer.

In this example, the object initialization kernel retrieves the database data by accessing the direct buffer. The direct buffer 730 shown in FIG. 7 contains memory addresses indicating where the data extracted from the database has been written in the plurality of memory regions, which it has received from the native-side multi cursor or from one of the cursors of the native-side multi-cursor. In this example, the information indicating the memory region where the data extraction kernel writes the database data is contained on the VM-side in the direct buffer.

Example b) While the plurality of memory regions are still located on the native side, the cursor of the native-side multi-cursor is configured to create, upon reception of the iteration call, a new direct buffer in the VM-side buffer API and to pass a direct address of the one of the plural memory regions via the buffer API to the direct buffer. The object initialization kernel is configured to obtain the database data for initializing the object by accessing the direct buffer.

According to examples a) and b), the VM-side buffer API knows which direct buffer or which field of the direct buffer it needs to access in order to obtain the database data in accordance with the memory address contained by the field. Moreover, in both examples, there may be one direct buffer item or a plurality of direct buffer items at a time instant or in the operation time of the apparatus.

According to example b), rather than passing the memory location to a direct buffer that has been created earlier, for example at the start of the whole database iteration or during compilation, a new direct buffer containing the memory address which is currently accessed in the current iteration step, is created with the iteration step.

However, the present disclosure is not limited to the plurality of memory regions of the buffer being located on the native side. In another example, the plurality of memory regions of the buffer are located on the VM-side, and the data extraction kernel is configured to write the database data to the buffer via the native-side buffer API.

In the examples a) and b) described above, the VM-side buffer API knows the information indicating the memory regions in the buffer where the database data is written by accessing the direct buffer where the locations of the memory regions are stored. However, in the example where the plurality of memory regions are located on the VM-side, the native-side (in-particular, the native-side database cursor) passes the database data themselves to the VM-side via the native-side buffer API. Accordingly, the native side knows the database data and does not need to access the data using memory addresses pointing to locations on the native side. No direct buffer for keeping memory addresses is needed on the VM-side.

As already mentioned, the present disclosure implements object-cursor mappings where object initialization is coupled by means of a cursor pair consisting of a cursor of a VM-side multi-cursor and an associated cursor of a native-side multi-cursor. Accordingly, for instance, the object initialization kernel is configured to initialize an object of the plurality of objects with the database data within a cursor step for each cursor in the native-side multi-cursor.

Moreover, as has further been described, information indicating one of the plural memory regions in the buffer where the data extraction kernel writes the database data is known to the native-side buffer API and to the VM-side buffer API. Accordingly, the object initialization kernel and the data extraction kernel agree (in their definition) on the buffer structure. To this end, the generation of the two kernels may be connected by means of isomorphisms. For example, each extraction strategy (e.g. the extraction strategies 1) to 3) mentioned above for the master-detail relationship) may be described by a definition of a corresponding pair of isomorphisms, the pair consisting of an isomorphism between the data objects and the buffer and a corresponding isomorphism between the buffer and the database. Generally, an isomorphism is a structure-preserving mapping between structures for which there is an inverse mapping. An isomorphism represents a correspondence, in particular a one-to-one correspondence, between structures. In the context of this disclosure, an isomorphism is a data structure representing program code.

Figure 8:
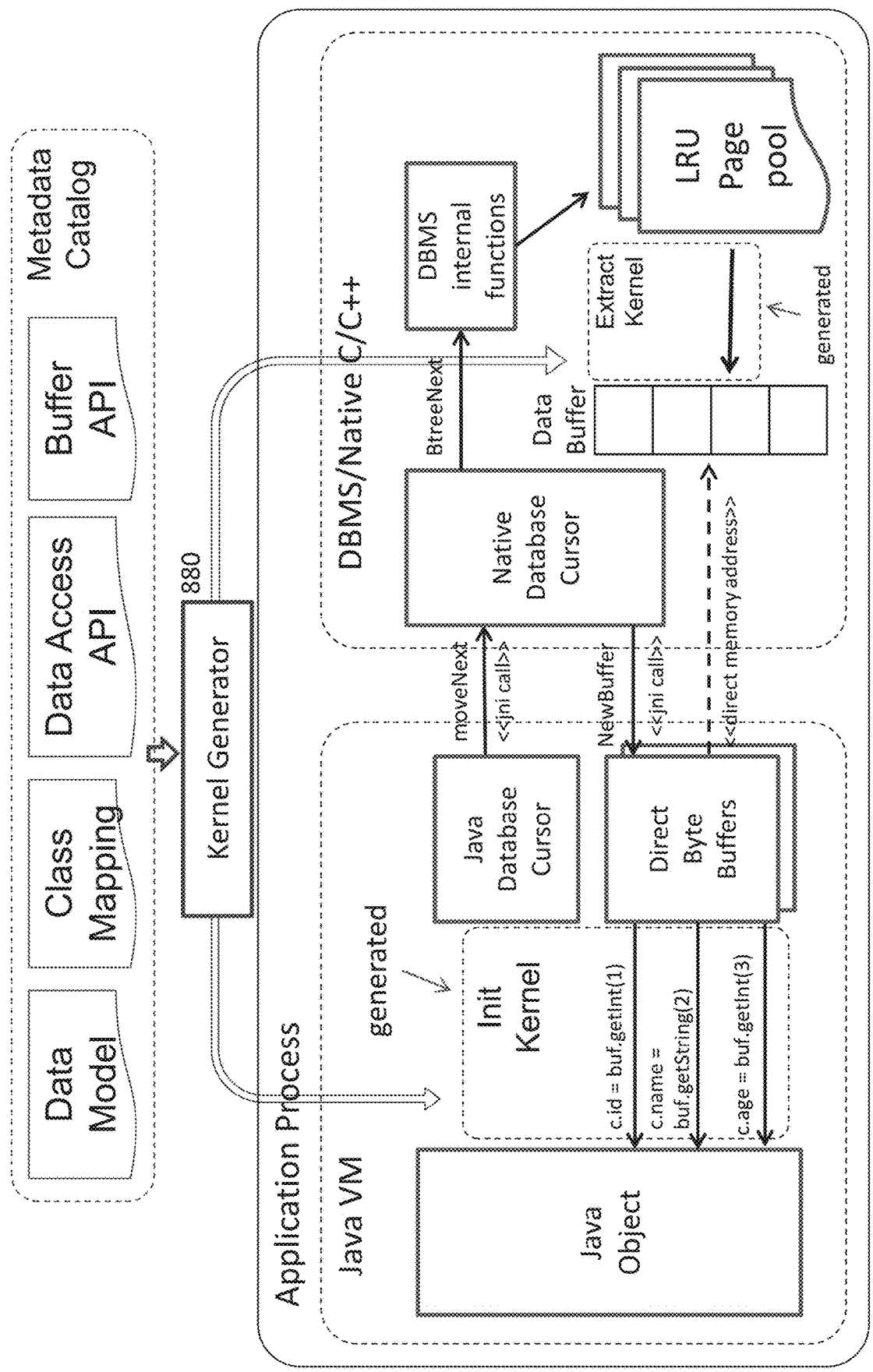
FIG. 8 is a block diagram of an apparatus for extracting data from a database including a kernel generator.

Therefore, according to an example shown in FIG. 8, the apparatus further comprises a kernel generator 880 for generating the object initialization kernel and the data extraction kernel. The kernel generator 880 is configured to generate the object initialization kernel 720 based on a first isomorphism between respective object types of the plurality of objects and a data format of the region layout in the buffer, and to generate the data extraction kernel based on a second isomorphism between a data format of the database data in the database interface and the data format of the region layout in the buffer. The first isomorphism and the second isomorphism are input into the kernel generator 880. The isomorphisms are data structures representing program code. The program code may be provided, for instance, as AST (abstract syntax tree), IR (intermediate representation), or a text file.

For instance, as is also shown in FIG. 8, in addition to the isomorphisms, a data model, an object-relational mapping, ORM, a data access application programming interface, API, a definition of the native-side buffer API and/or a definition of the VM-side buffer API are further input to the kernel generator. Therein, a data model is a data structure representing classes with methods and properties. On ORM is a data structure representing the mapping of the data model to the items (tables, views, etc.) of the database. A data access API is a data structure representing interfaces, methods, and properties of a data access library. In other words, a data access API is an instance of an API descriptor data type. The definitions of the buffer APIs are other instances of an API descriptor data type.

The object initialization kernel 720 on the VM-side 710 comprises the VM-side buffer API, and the data extraction kernel 760 on the native side 750 provides the native-side buffer API. The VM-side buffer API and the native-side buffer API are provided, respectively, by the object initialization kernel and the data extraction kernel. The buffer structure may be an arbitrary buffer structure and include an arbitrary structure/layout of memory regions, and is determined by the first isomorphism between the buffer layout and the data objects (i.e. between database data extracted by the cursors of the native-side multi-cursor and the buffer structure/layout) and the second isomorphism between the format of the database data in the database interface and the buffer layout (i.e. between the buffer structure/layout and the multiple objects being initialized from the database data). Resulting from the generation of the two kernels based on the data model, data access API, buffer API definitions, and ORM, the isomorphisms are inherent to the two linked kernels, (i.e. the kernels are linked by means of providing respective implementations of the same general buffer API). The structure of the buffer may be arbitrary if the two isomorphisms are provided.

The kernel generator may generate the object initialization kernel and the data extraction kernel dynamically at runtime. However, the respective kernels may alternatively be generated, for example, during compiling time.

For instance, the object or plural objects being generated may be Java objects, as shown in FIGS. 7 and 8. Accordingly, the VM may be a JVM. However, although this disclosure provides several examples where Java is used, the present disclosure is not limited to this technology. Other possible examples are JavaScript or the Microsoft .NET framework. The disclosure is applicable to systems comprising a JIT compiler.

Moreover, some of the examples in the description use an Android execution environment and an Sqlite DBMS (database management system). However, it can also be applied in other contexts, e.g. in the context of Apple iOS technology.

So far, the case has been described in which database data is extracted from the database and data objects are initialized. However, the present disclosure is also applicable to the case where, based on operations such as field modifications or instantiation of data objects within the VM, data in the database is modified, or new data is written into the database. When data is moving from VM to native, the roles of the VM-side and native-side buffer API implementations and the respective kernels is swapped.

Figure 9:
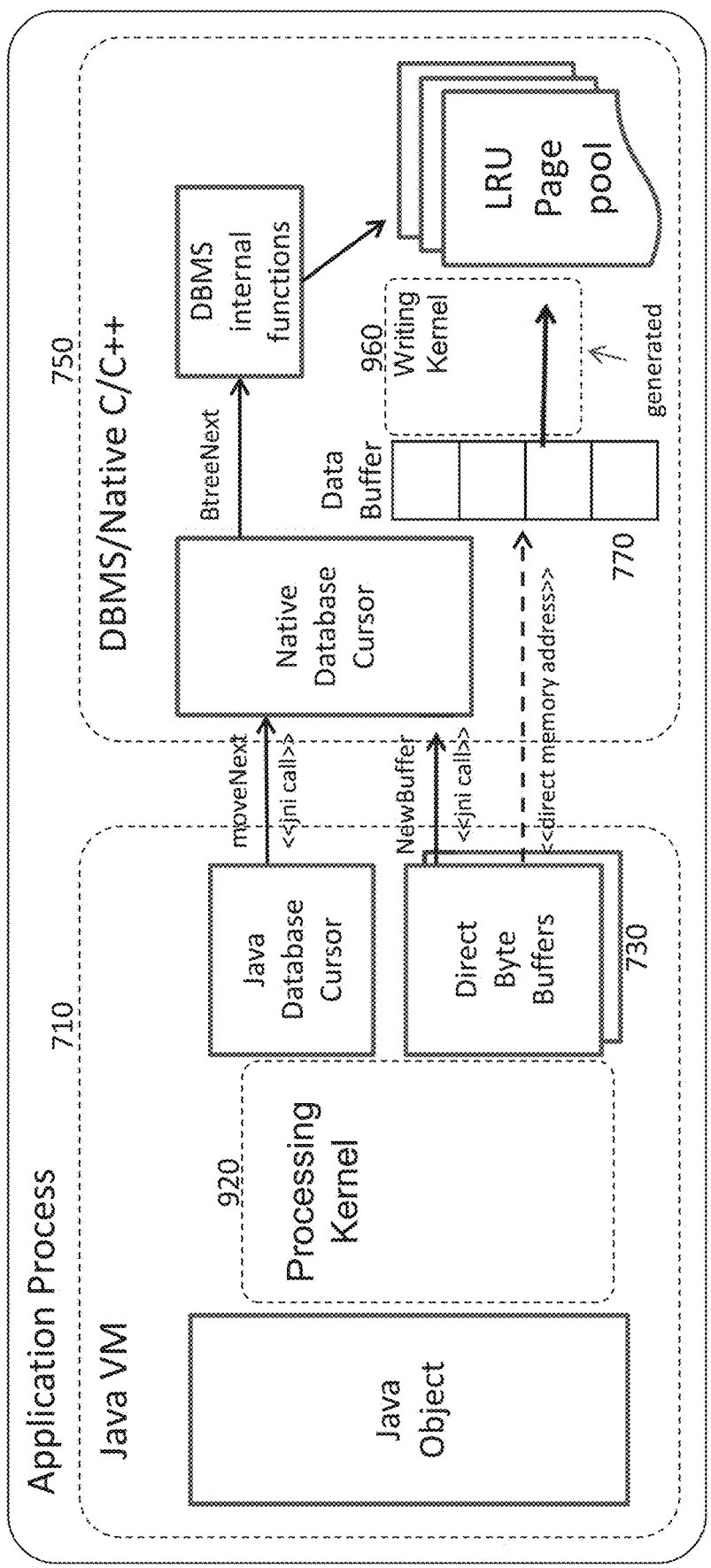
FIG. 9 is a block diagram of an apparatus for writing data to a database.

In particular, the present disclosure further provides an apparatus for writing data to a database, which is shown in FIG. 9. The apparatus for writing data to a database comprises a database interface configured to enable communication with the database, a VM 710, and a buffer 770 comprising a plurality of memory regions. The apparatus for writing data to a database further comprises, on the VM-side an object processing kernel 920 comprising a VM-side buffer application programming interface, API, and is configured to write object data from a plurality of objects to the buffer using the VM-side buffer API. Moreover, the apparatus for writing data to a database comprises, on the native side, a data writing kernel 960 comprising a native-side buffer API and is configured to read the object data from the buffer using the native-side buffer API and write the object data to a plurality of locations in the database using the database interface. Information indicating one of the plural memory regions in the buffer where the object processing kernel writes the database data is known to the native-side buffer API and to the VM-side buffer API.

The object data corresponds, for example, to properties of data objects. With respect to the apparatus for reading data from a database described earlier, in the apparatus for writing data to a database reading data from the buffer on the VM side is replaced by writing data to the buffer. Moreover, writing data to the buffer on the native side is replaced by reading data from the buffer, and data extraction from the database is further replaced by writing data to the database. Apart from that, the apparatus for writing data to a database may be implemented in analogy with the apparatus for extracting data from a database. In particular, a device may have both reading and writing capabilities both on the VM side and on the native side in both directions (i.e. objects↔buffer on the VM side and buffer↔database on the native side), thereby incorporating an apparatus for extracting data from a database as shown in FIG. 7 and described formerly and the apparatus for writing data to a database as shown in FIG. 9.

The database with which the apparatus for extracting data from a database and/or the apparatus for writing data to a database communicates via the database interface may be comprised by the apparatus. For instance, the database, i.e. the database file(s) or the file system containing the database file(s) shown in FIG. 6 may be stored locally on the device which operates as the apparatus. However, the present disclosure is not limited to the database being located on the same device as the apparatus for extracting and/or writing data. In particular, the database may be located on a remote server, to which the apparatus connected via a wireless or wired connection.

The apparatuses for reading and writing data to/from a database may be incorporated in a mobile device such as a tablet computer, laptop, or a mobile telephone/smart phone. However, the method may also be implemented in a personal computer.

In correspondence with the apparatus for extracting data, the present disclosure further provides a method for extracting data from a database. A flow chart of the method is shown in FIG. 10. The method includes the step of reading database data S1010 from a plurality of locations in the database using a database interface and, the database data corresponding to a query result. The method further comprises the step of writing the database data to a buffer S1020 comprising a plurality of memory regions using a native-side buffer application programming interface, API. The method also comprises the steps of reading database data from the buffer 51030 using a virtual machine, VM-side buffer API, and initializing S1040 a plurality of objects with the database data read from the buffer. In the steps of the method, information indicating one of the plural memory regions in the buffer where database data is written is known to the native-side buffer API and to the VM-side buffer API.

Moreover, the present disclosure provides a method for writing data to a database. A flow chart of the method is shown in FIG. 11. The method for writing data to a database comprises the step of writing object data from a plurality of objects to a buffer S1110 comprising a plurality of memory regions using a VM-side buffer API. The method further comprises the step of reading the object data from the buffer S1120 using a native-side buffer API. Moreover, the method comprises the step of writing the object data to a plurality of locations in the database 51130 using the database interface. In the steps of the method, information indicating one of the plural memory regions in the buffer where the object data is written is known to the native-side buffer API and to the VM-side buffer API.

The methods for reading/writing data to/from a database are to be performed by the apparatuses for reading/writing data to/from a database. Moreover, the present disclosure provides a computer readable medium storing instructions causing a computer to perform the method for reading data from a database and/or the method for writing data to a database.

In the following, further details will be provided with respect to particular details of the apparatuses and methods provided by the present disclosure. A method for object initialization/materialization from database data and a system to instantiate the method will be described to improve the performance of a data transfer pipeline.

In particular, a method is proposed to implement fast data object (e.g. Java objects) initialization/materialization, which comprises the following steps:
1. Describe Data Model and Class Mapping using known methods;
2. Implement DBMS-specific Data Access API and Buffer API in a code generation framework which support definition of abstract data types and related functions on an OOP (object oriented programming) language;
3. Generate Extract Kernel (data extraction kernel) and Init Kernel (object initialization kernel) by using Converter Generator using Data Model, Class Mapping, Data Access API and Buffer API as its input to source code as output;
4. Compile the generated code and package Init Kernel and Extract Kernel into dynamically linked libraries (Java/VM libraries and Native libraries correspondingly).
5. Link, either statically at compile time or dynamically at runtime, said libraries so that they can be used by the components of the system at runtime.

Source code is a textual representation of a source program using a programming language. A source program is computer program that is used as an input to the compiler. It is translated into executable machine code.

A system which instantiates the method may comprise the following components:
1. VM-side database cursor, which may be included in a VM-side multi-cursor pipelined with Native-side Database Cursor, which together move over rows of the query result set.
2. Native-side Database Cursor, which may be included in a native-side multi-cursor, and which:
   a. accesses internal functions of the DBMS and read database data
   b. executes Extract Kernel to fill Data Buffer memory with information from database
   c. uses JNI (Java Native Interface as an example of a VM-native interface) to create at least one direct buffer (i.e., in Java, a DirectByteBuffer) at VM-side and pass to it the direct address of the Data Buffer.
3. Init Kernel, which is executing inside VM and performing:
   a. Invocation of moveNext operation of VM-side database cursor
   b. Receiving direct buffers, which point to next buffer data, i.e. to the memory region of the next buffer data
   c. Executing operations of the direct buffer(s) to read database data (e.g. row data) and initialize data object fields/properties.
4. Kernel Generator, which:
   a. supports definition of abstract data types and related functions;
   b. is configured with Data Model, ORM Class Mapping, Data Access API, Buffer API(s), i.e. the general buffer API and/or its native and VM-side implementations;
   c. upon invocation, generates a composable pair of kernels: 1) Extract Kernel, which fills data buffer by means of the native-side buffer API; 2) Init Kernel, which reads from data buffer by means of the VM-side buffer API.

An exemplary system (apparatus) to implement the method of fast object materialization from database data is shown in FIG. 8. In the following, details will be provided on components of the system:

VM-side database cursor: When Java application needs to access data it issues SQL query and gets result back as a cursor (of the VM-side multi-cursor) over collection of database data items such as rows. The cursor is then iterated to retrieve rows or database entries/values one by one. Java-side Cursor is pipelined with a Native-side Database Cursor, which together move over rows of the result set synchronously. As it is known, cursors are typically used internally in ORM implementation. On each step the data from the cursor is transferred to fields/properties of Java object.

Native-side database cursor: The lifecycle of the native-side (or "native", for short) database cursor can correspond to the lifecycle of the VM-side database cursor, but may also be different, by using pooling and/or other optimization mechanisms. A minimal requirement is to bind the native-side cursor with the corresponding VM-side cursor for the period of iterating over VM-side cursor. In this disclosure, such binding is assumed.

A minimal patch of Sqlite to support the method is shown in FIGS. 12A and 12B. The definition of FIG. 12A is added to sqliteInt.h. In FIG. 12B, only necessary internal functions are marked. Totally, 6 files changed with 18 additions and 16 deletions. As a result, the marked functions become exportable and available from other libraries for linking (e.g. directsqlite.so).

Figure 13B:
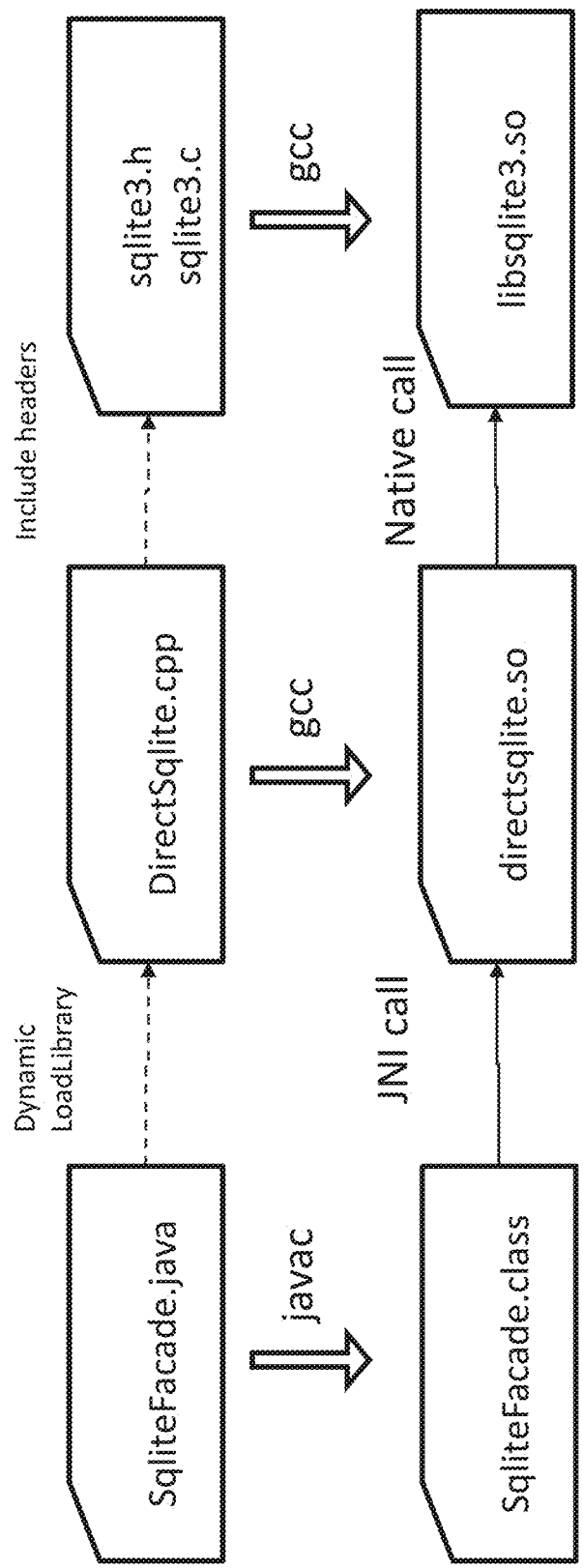
FIG. 13B is a block diagram of libraries implementing a data transfer pipeline.

The native-side cursor accesses internal DBMS functions to produce row data on each step. The interaction between fragments of the code execution during each step of data transfer pipeline is exemplified in FIG. 13A. However, it should be noted that the present invention is not limited to SQLite. Other DBMS such as Cassandra or Apache Spark may be used as well where data has to be transferred between native and VM environments. In the example, the code fragments belong to different software libraries whose relationships are shown in FIG. 13B.

The Extract Kernel (data extraction kernel) is generated by a kernel generator component either at compile time of the application or dynamically at runtime, depending on the embodiment and by using the method described later in more detail.

The kernel is executed once for each step of the cursor, this can also be changed in different embodiments and not key design choice.

Figure 14:
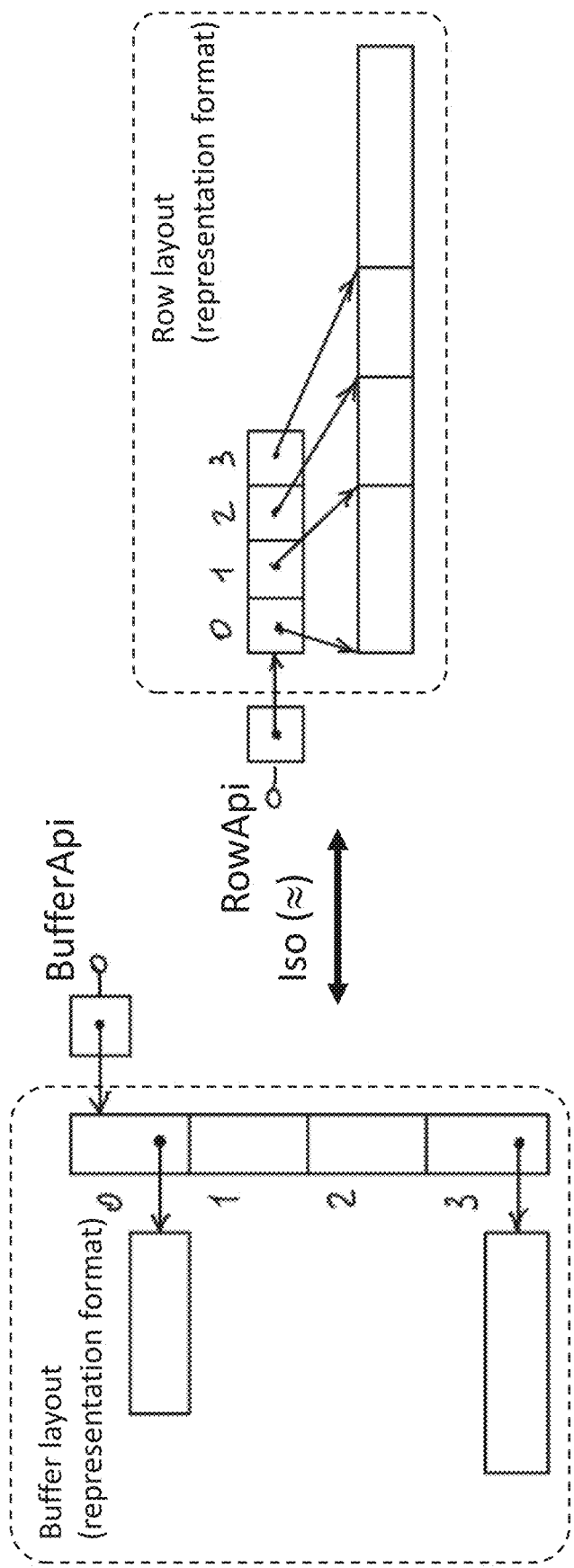
FIG. 14 is a schematic drawing of isomorphic concrete data representations for DBMS row and a buffer.

The kernel is given two pointers as shown in FIG. 14: a pointer to the DBMS RowApi (corresponding to a database interface) and pointer to the native-side buffer API. During execution of the kernel, the data is copied from the DBMS to the buffer.

Direct buffer: Direct Byte Buffer as an example of a direct buffer is a special Java object to efficiently access off-heap memory regions from Java code. DirectByteBuffer is a special Java object used to provide a region of memory "shared" between VM and native sides and avoid data copying. The Direct Byte Buffer can be created during execution of native code using JNI interface by invocation of the following code
    env->NewDirectByteBuffer(pBuffer, bufferSize)
where env is JNIEnv object, pBuffer is a pointer to buffer memory, bufferSize the size of the buffer memory in bytes.

Depending of the concrete Buffer Layout (as exemplified in FIG. 14), one or more Direct Byte Buffers can be created. When there are plural Direct Byte Buffers, each DBB represents one of the memory regions inside the buffer. They should form a list. The head of this list is passed to the VM-side, where this list of buffers is used in Init Kernel to extract data from the buffer. The content of the buffers memory is filled up during execution of Extract Kernel. Different allocation/reallocation strategies as are known in the art can be used to manage the list of Direct Buffers during execution of data transfer pipeline and between cursor steps.

The Init Kernel (object initialization kernel) is generated by the kernel generator component either at compile time of the application or dynamically at runtime, depending on the embodiment.

The kernel is executed on the VM-side once for each step of the cursor and one object; however, this can also be changed in different embodiments. For example, in complex ORM mapping schemas a single data object can be mapped to many tables. In this case, Init Kernel will use many cursors and many buffers (or buffer memory regions) while initializing single Java object.

The Init Kernel is given two pointers: a pointer to a VM-side Buffer API object and a pointer to an ORM object/data object which need to be initialized. During execution of Init Kernel, the data is copied from the buffer to the fields of the object.

The direct buffer provides access to a native memory region. The list of direct buffers is created to contain concrete data from database in some specific layout, which is used in Buffer API implementation (see FIG. 14 for example of layouts and the following method step description (step 2) for details of Buffer API implementation).

Each direct buffer object is used in Init Kernel code and is accessed by invocation of corresponding methods of the VM-side buffer API. In order to provide good performance, the code of Init Kernel should contain direct invocations of methods of direct Buffers, which are inlined by the JIT compiler and are subject to compiler optimizations.

The Init Kernel and Extract Kernel are generated by the kernel generator 880. The steps of kernel generation will be described below in more detail in the following, in particular in step 3 and step 4 of the following method description.

It is an important point of the present disclosure that the system shown in FIGS. 7 to 9, the VM-side cursor is pipelined with native-side cursor, in order to enhance cache efficiency. The buffer (RowBuffer) is filled up by the generated Extract Kernel, in accordance with the database specific store design. Moreover, the direct buffer (DirectByteBuffer) is created in the VM to avoid data transfer from native side to VM side, which may contribute to an enhancement in memory efficiency. The direct buffer is unpacked at Java side by the generated Materialize Kernel (or Object Initialization Kernel). A single generic metadata-driven Codegen (kernel generator) is used to generate both Extract Kernel and Initialize/Materialize Kernel that work in tandem.

A method is provided that can be used to implement an efficient data transfer pipeline from database to Java objects. The method is instantiated by the following steps:

Step 1: Describe Data Model and Class Mapping

Figure 15:
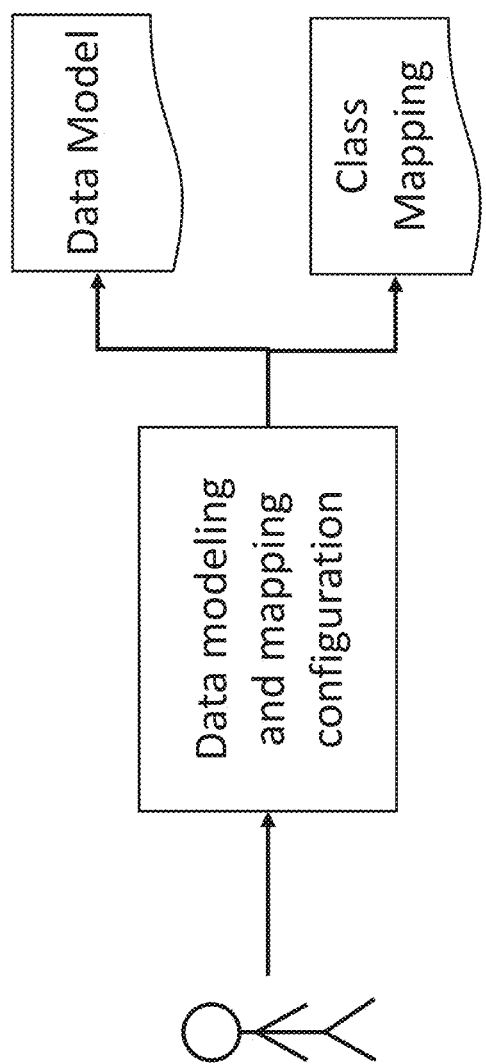
FIG. 15 is a flow chart of data modeling and class mapping.

This step is implemented by tools known by a skilled person according to the flowchart shown in FIG. 15. The process proceeds as follows:
1) The ORM user performs data modeling and configuration as is known by the skilled person.
2) The resulting artifacts are stored in Data Model and Class Mapping repositories (for instance, the repositories can be as simple as XML files and as complex as some Cloud Storage Services).

Step 2: Implement Data Access API and Buffer API

Figure 16:
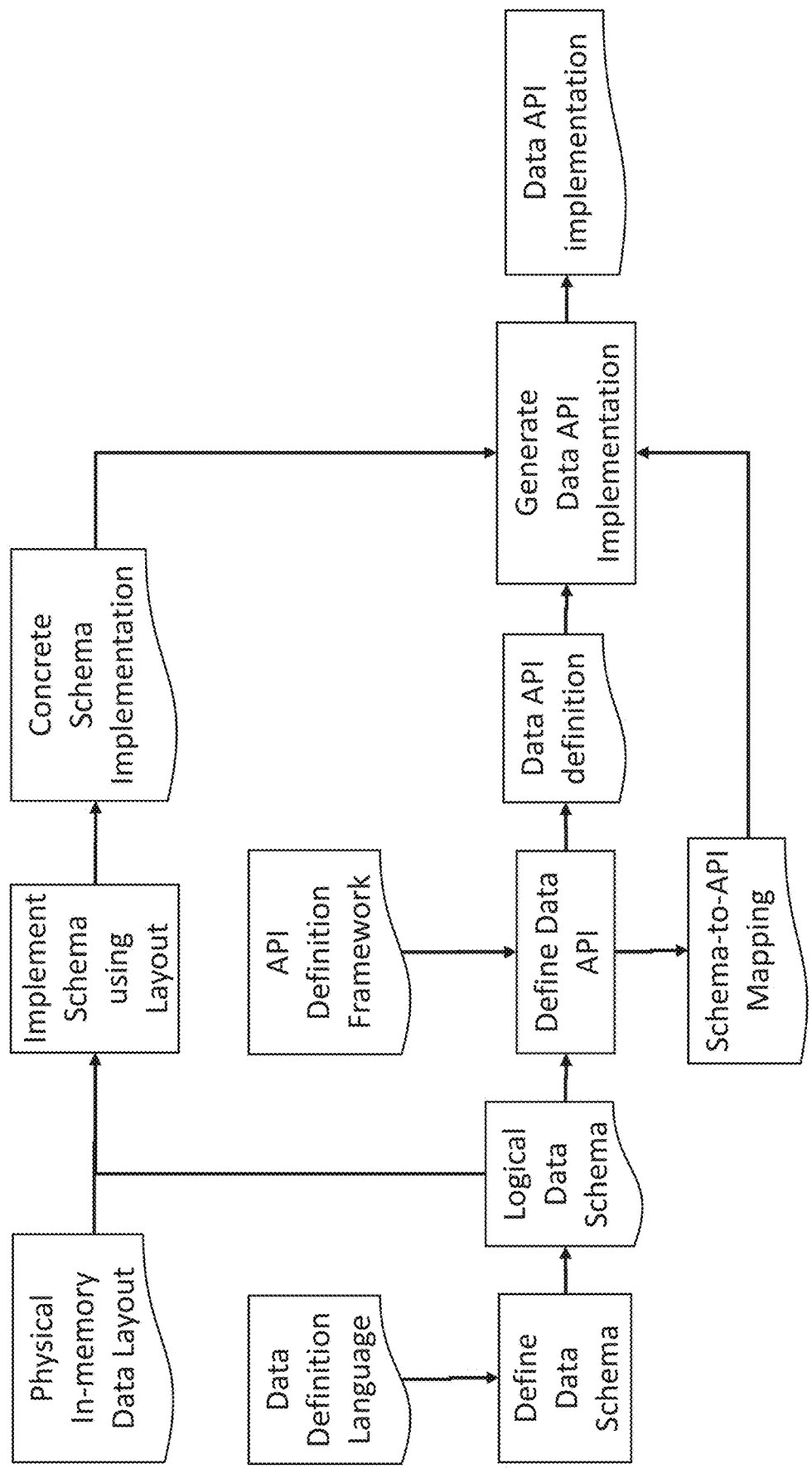
FIG. 16 is a flow chart of a method of implementing a Data API.

Both Data Access API (which is an implementation of the database interface) and Buffer API are implemented using the same method outlined in FIG. 16. The method is instantiated as follows for the data access API and, respectively, the buffer API:

For the Data Access API: the physical in-memory Data Layout is defined to be memory layout of DBMS and Logical Data Schema is defined to be the schema of the database. This instantiation of the method produces a Data Access Library for a DBMS.

For the Buffer API: the physical in-memory Data Layout is defined to be the layout of the buffer data in memory and Logical Data Schema—to be the corresponding fragment of database schema (sub-schema). For example, if the buffer contains only a single row of a DBMS table, then this sub-schema will be the schema of the table. This instantiation of the method produces implementation of the buffer data structure including both traversal and building operations in the API. In this step 2, the buffer API corresponds to an implementation of the general buffer API mentioned above, in particular the native-side buffer API.

The process proceeds as follows:
1) Logical Data Schema is defined using any Data Definition Language known in the art (this step is performed by the ORM developer).
2) Using any API Definition Framework (for API definition frameworks see, for instance, "Open API initiative," available online at https://www.openapis.org/) known in the art, define Data Access API is defined and connected with the Logical Data Schema by defining a Schema-to-API mapping artifact. (this step is performed by the ORM developer). An example of a Schema-to-API mapping is shown in Table 1.

TABLE 1

| Example Schema-to-API mapping | | |
|---|---|---|
| Storage Schema element | Storage Traversal API element (Java-like language) | Description |
| database.tables | Iterator<Table> Storage.getTables( ) | Traverse over all tables defined in the database |
| Table "tableName" | Table Storage.getTable(tableName) | Access single table in the storage by tableName |
| table rows | Iterator<Row> Table.getRows( ) | Traverse over all rows in the table |

3) The Logical Data Schema is implemented using any Physical Data Layout known in the art: in particular, row-based layouts, column-based and mixed layouts can be used See Concrete Schema Implementation in FIG. 16. Known implementations techniques may be used. For example each Logical schema can be one-to-one associated with classes and methods of OOP language interfaces in which case Concrete Schema Implementation can be comprised of manual implementation of the corresponding interfaces using given Physical In-memory Data Layout.
4) A Concrete Schema Implementation, Data API definition and Schema-to-API Mapping is used to generate Data API implementation as an instance of IR of object oriented language such as Java/Scala. This can be automatic or manual step.
5) Generated Data API implementation is optionally prepared to be used in a framework with staged evaluation i.e. it is virtualized as in "AUTOMATIC CODE VIRTUALIZATION FOR A COMPILER", Patent application WO2017095257.

When the process is performed in accordance with items 1) to 5), the result of the application will be a fully functional API implementation which conforms to logical schema and keeps the data in concrete in memory layout.

Figure 17:
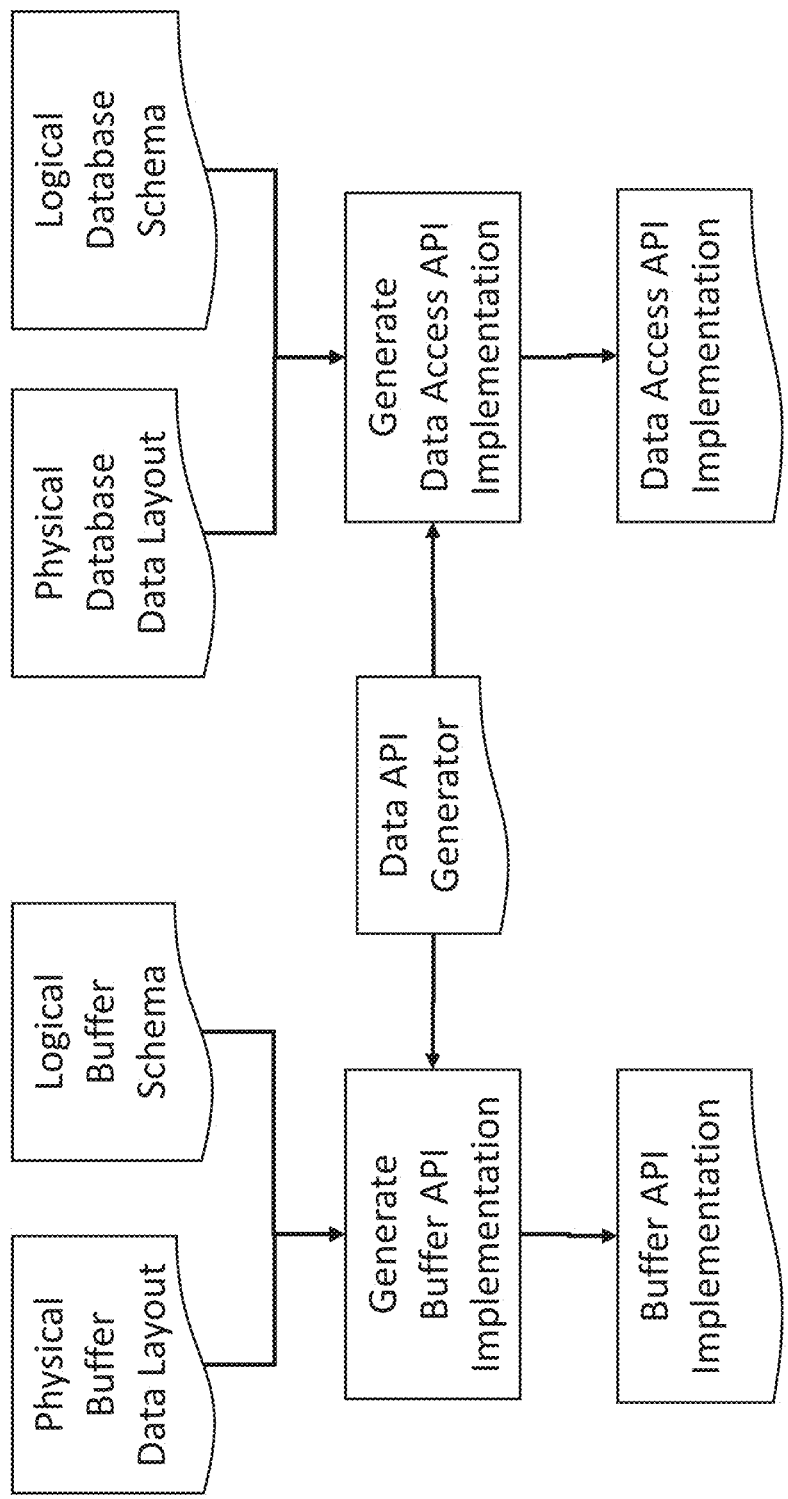
FIG. 17 is a flow chart of reuse of a Data API generator for Buffer API implementation and Data Access API implementation.

It is an idea of this method to use the same process both for generation of Data Access layer of the database and for additional buffering of extracted information, i.e. to reuse the Data API Generator. This is shown in FIG. 17. For the Buffer API implementation, a Physical Buffer Layout and a Logical Buffer Schema is used, and correspondingly, for the Data Access API implementation, a Physical Database Data Layout and a Logical Database Schema is used. This design facilitates technological reuse inside the DBMS, and gives many implementation choices to produce different data dependent buffering schemas and implementations to construct efficient data transfer pipelines as part of ORM and similar data access tools.

Step 3: Generate Source Code of Kernels

Figure 18:
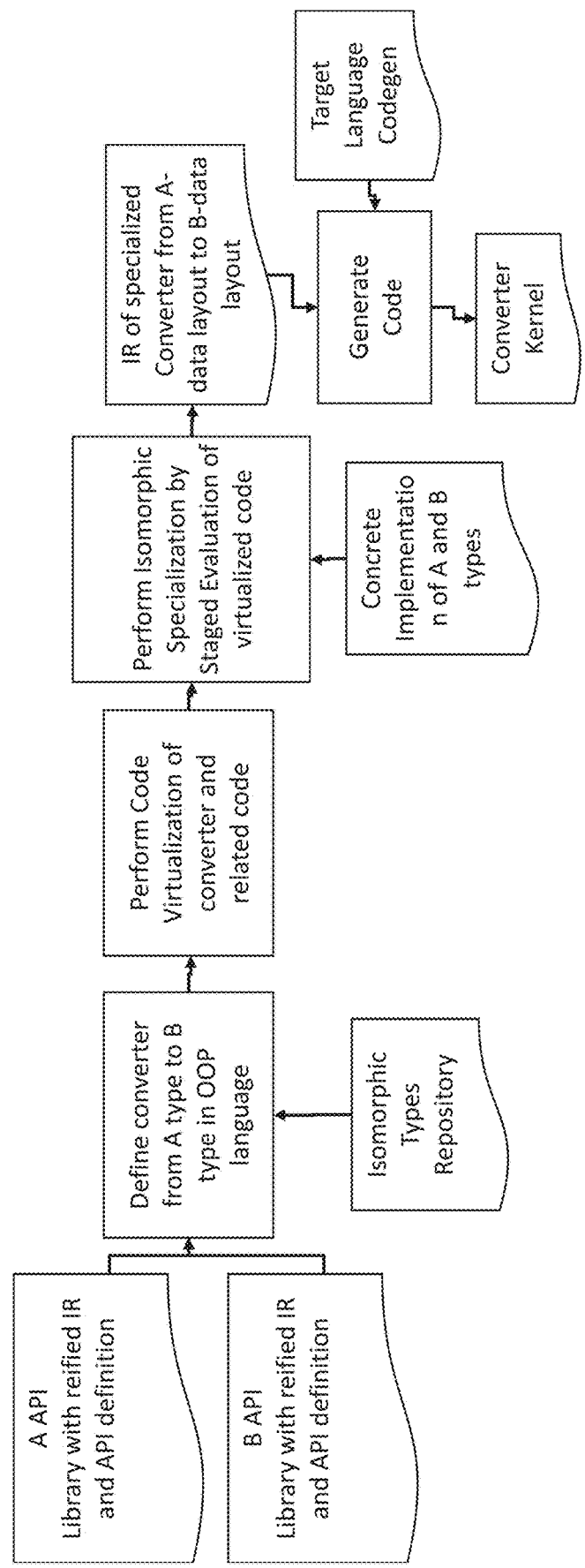
FIG. 18 is a flow chart showing a method of implementing data conversion kernels.

Both Init Kernel and Extract Kernel are implemented using the same method outlined in FIG. 18. The method is instantiated as follows:

For the generation of Init Kernel: An A API Library is defined to be Buffer Java Library, a B API library—to be ORM Java library, and Isomorphic Types Repository—to be a set of isomorphisms between Java types and Buffer Items.

For generation of Extract Kernel: The A API Library is defined to be Data Access Library of DBMS, B API library—to be Buffer C++ library, and Isomorphic Types Repository—to be a set of isomorphisms between DAL (database abstraction layer) types and Buffer Items. An example of isomorphic data types is shown in Table 2 where a Scala-like language is used, corresponding to Isomorphic Data Types as in [1] A. Slesarenko, A. Filippov and A. Romanov, "First-class isomorphic specialization by staged evaluation," in 10*th ACM SIGPLAN workshop on Generic programming*, Gothenburg, 2014, incorporated herein by reference.

TABLE 2

Isomorphic API data types

| Buffer Type | Row Type |
|---|---|
| BufferInt | RowInt |
| BufferDouble | RowDouble |
| BufferString | RowText |
| ByteArray | RowBlob |
| BufferItem | RowCell |
| Collection[BufferItem] | Collection[RowCell] |
| Class Buffer( | class Row( |
| Val items:Collection[BufferItem]) | Val cells:Collection[RowCell]) |

Figure 19:
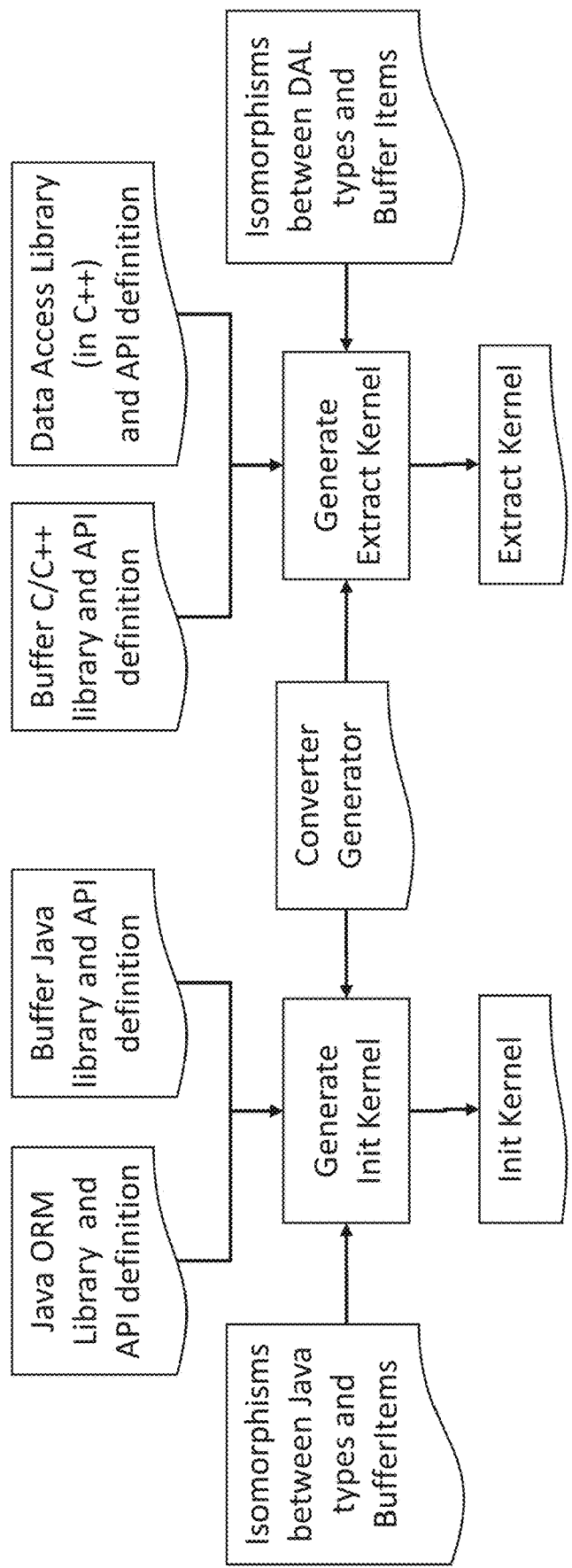
FIG. 19 is a flow chart of reuse of a converter generator to produce kernels.

An important observation and idea of the method shown in FIG. 18 is to realize that both kernels are converters between types and thus it is possible to use the same process both for generation of Init Kernel executed at Java side of ORM and for generation of Extract Kernel executed at Native side of DBMS. This is shown in FIG. 19 where the method is implemented by a Converter Generator artifact. Therein, the Converter Generator is reused for the generation of the Init Kernel and, respectively, the Extract Kernel. Moreover, it can be seen that a pair of isomorphisms is input into the Kernel Generator, an isomorphism between object types and buffer items, i.e., data format of the region layout in the buffer, and an isomorphism between DAL types (and accordingly, a data format of the database data in the database interface) and buffer items. Accordingly, the kernel generation can be performed in a way that information on memory regions where data is located in the buffer is known to the buffer APIs both on the native side and on the VM (Java) side.

The process for implementing data conversion kernels shown in FIG. 18 proceeds as follows:

1) Having two libraries A-library and B-library, selecting two types A-type and B-type correspondingly, then the converter between types A and B is implemented as it is shown in the example code implementation of converter between Row and Buffer API types shown below. In many cases in the framework with first class isomorphisms (see also [1] and Table 2) converters between types A and B can be generated automatically. For example getConverter function used in the example code can be implemented as it is done in Scalan framework (see "Generic construction of data converters," available online, https://github.com/scalan/scalan/blob/master/core/src/main/scala/scalan/Converters.scala#L159). First-class isomorphisms are "rightful" objects. I.e., like any other data objects, they can be created, modified, composed, stored, etc. Scalan is a DSL (domain specific language) development framework for compilation in Scala based on staged evaluation. Scalan uses graph-based intermediate representation. Scalan further supports graph rewriting, slicing, isomorphic specialization and other generic program transformations.

```
trait BufferItem { }
  class BufferInt(val i: Array[Byte]) extends BufferItem { }
  trait RowCell { }
  class RowInt(val i: Array[Byte]) extends RowCell { }
  trait Converter[T,R] {
    def apply(x: T): R
  }
  class Buffer(val items: Collection[BufferItem])
  class Row(val cells: Collection[RowCell])
  // following is implemented by isomorphic specialization framework
  def getConverter[T,R]( ): Converter[T,R]
  // following should be virtualized and then staged
  def convertRowToBuffer(buf: Buffer, row: Row) {
    val converter = getConverter[RowCell, BufferItem]( )
    for (cell <- row.cells) {
      val item = converter.apply(cell)
      buf.items.add(item)
    }
  }
```

2) Converter code is virtualized as it is known in the art (for more details, see "AUTOMATIC CODE VIRTUALIZATION FOR A COMPILER", patent application, WO2017095257).

3) Virtualized Converter is configured to be specialized with respect to concrete implementation of A and B types using concrete data layouts. Examples of two different but isomorphic layouts are shown in FIG. 14. The specialization is performed as it is known is the art by using Isomorphic Specialization during process of staged evaluation of the abstract converter code shown in the above example code portion of the converter between Row and Buffer API types. Staged evaluation as defined in [1] is the process of evaluating program terms symbolically in order to produce graph-based IR. This process can be combined with a set of rewriting rules (RW). When these rules are applied to the nodes of the graph which is constructed by staged evaluation, the graph is transformed into another graph, which is specialized with respect to a pre-defined set of isomorphisms.

4) Intermediate Representation, IR, of specialized converter is further processed by generating kernel code using a target language code generator (Target Language Codegen) as it is known in the art.

The above items 1) to 4) have an effect of data transfer from a concrete layout of type A to concrete data layout of type B, which can be used in a data transfer pipeline according to this disclosure.

Step 4: Package Kernels as Libraries:

The generated source code of Init Kernel and Extract Kernel is compiled with Java and C++ compilers respectively and packaged as a library as it is known in the art.

Step 5: Use Kernels in Data Transfer Pipeline:

The Init Kernel and Extract Kernel libraries are dynamically linked with ORM and DBMS components during running time as it is known in the art.

Figure 20:
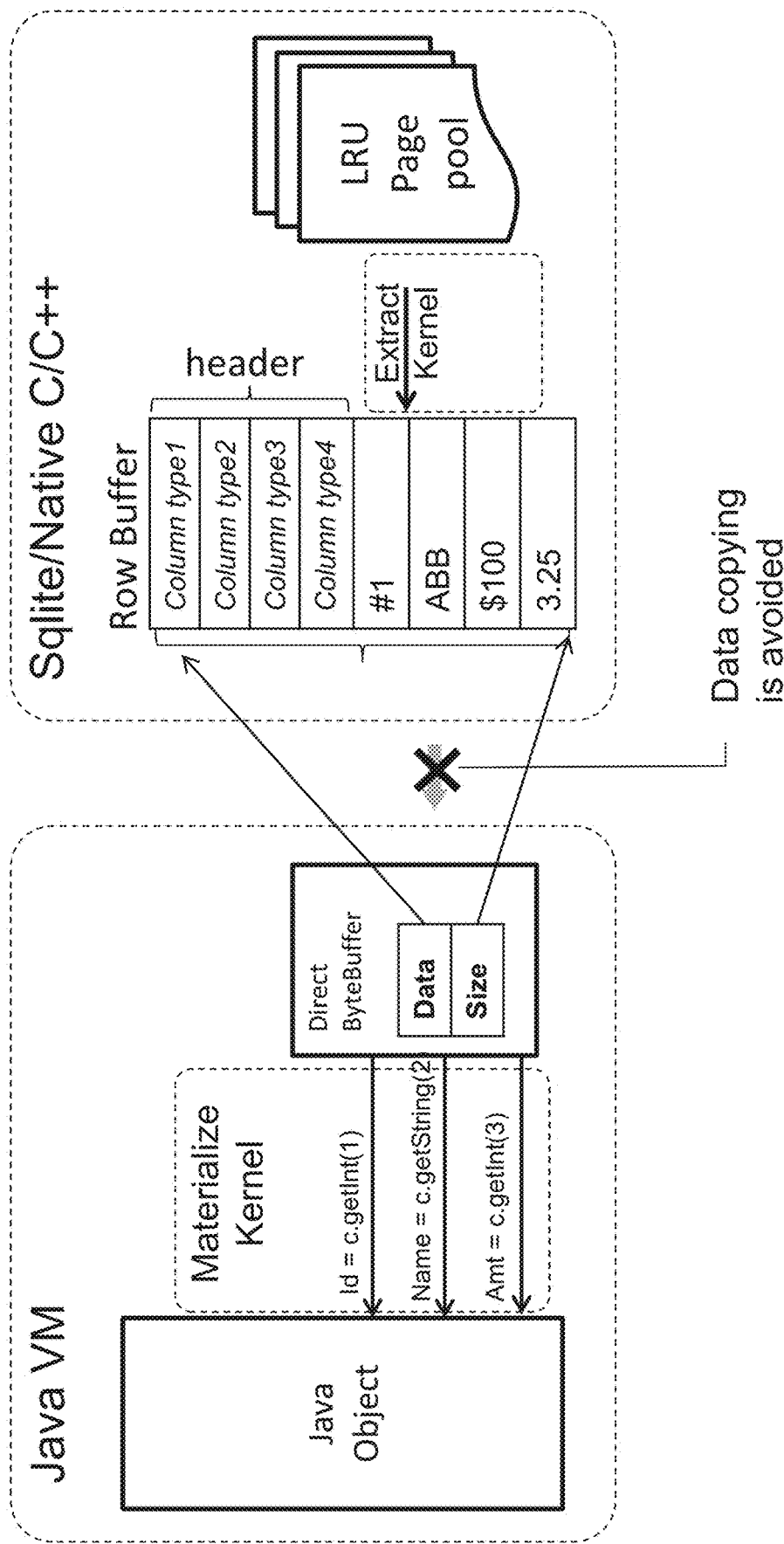
FIG. 20 is a block diagram of an apparatus for extracting data from a database.
Figure 21:
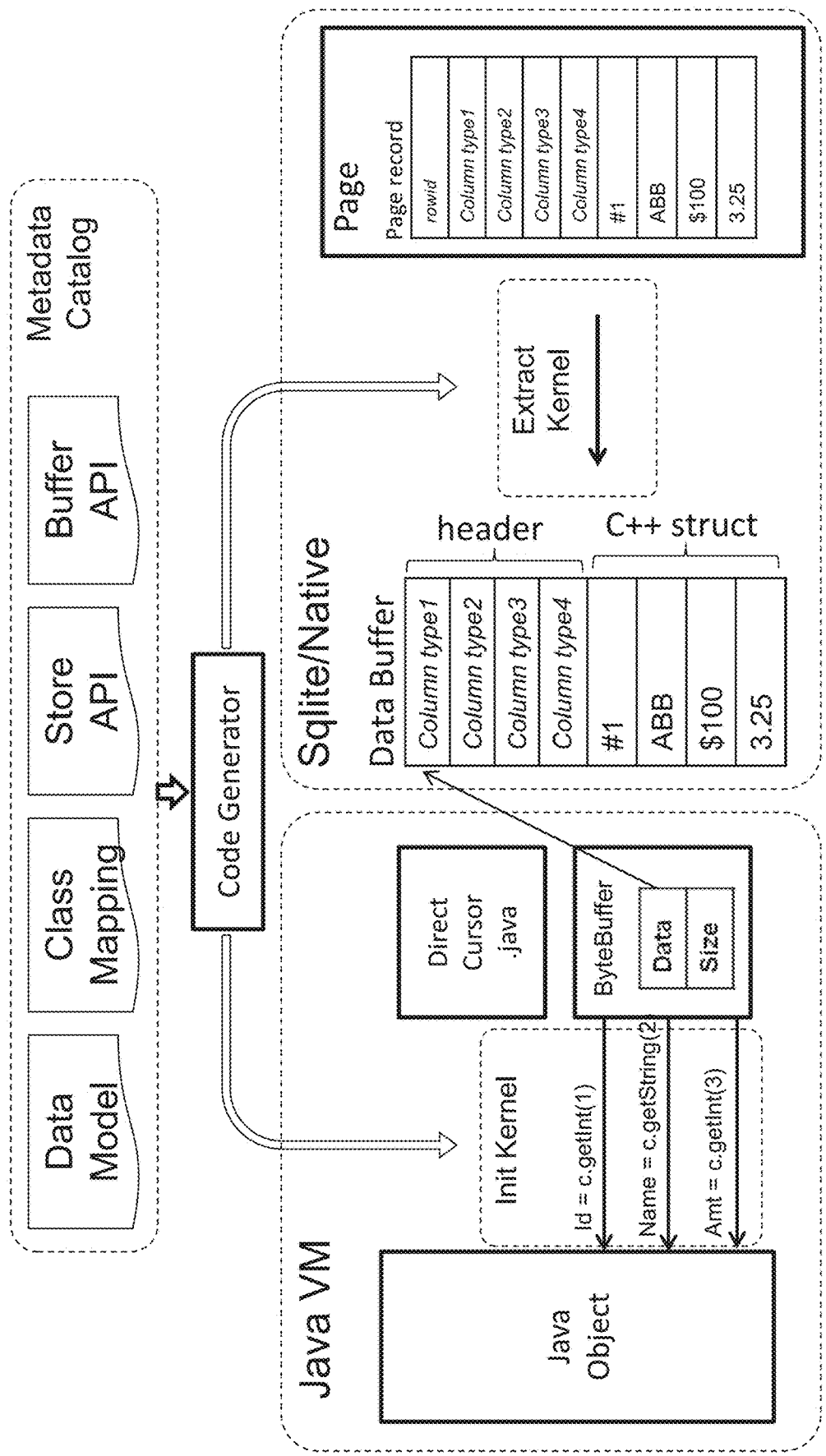
FIG. 21 is a block diagram of an apparatus for extracting data from a database.

Next, some points of the present disclosure are emphasized with reference to an example shown in FIGS. 20 and 21. The transferring of native data to the data objects via Direct ByteBuffer is shown in FIG. 20. Therein, data copying (from the native side to the VM side) is avoided. In FIG. 21, it is shown how database specific kernels are generated. In this design, a layout-specific kernel to extract entity data is used. Moreover, a single generic metadata-driven Codegen for both Native and VM sides is provided. Different row buffer formats may be used for different objects and tables.

In the following, a prototype implementation (which is referred to in the following also as DirectSqlite) of the present disclosure is compared with android.database.sqlite—an existing data access Java API provided by Android SDK. As benchmark database the TPC-H decision support benchmark database schema was chosen, and a 1.5 Mb database size was used.

Figure 22:
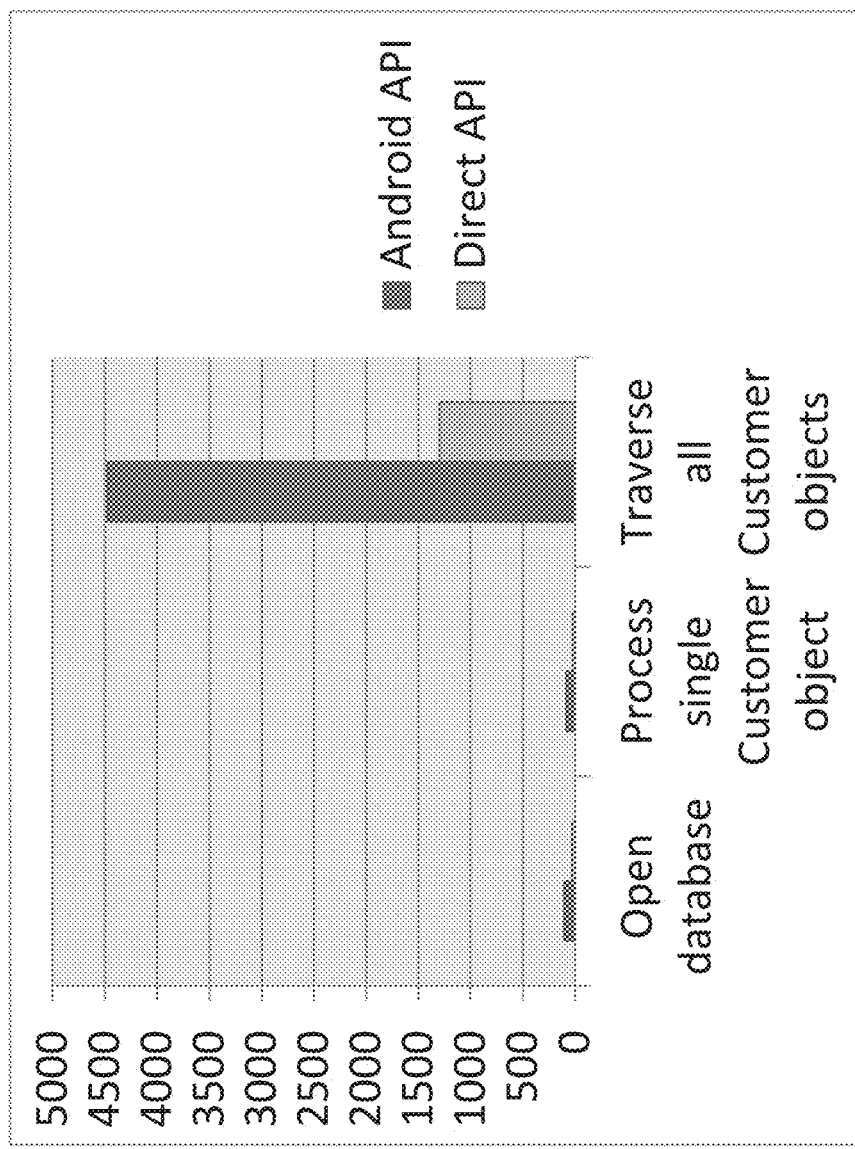
FIG. 22 is a diagram showing 1 benchmark results for typical data access scenarios.

Execution times for typical data access scenarios are shown in FIG. 22 and Table 3 for the existing Android API (left respective columns) and the DirectSqlite prototype implementation (right respective columns). The results show significant performance benefits when using the DirectSqlite data access implementation. It is noted that if the processing time exceeds 50 msec is recommended by Google to offload to it a separate thread. This makes app code more complex and also more battery hungry.

TABLE 3

Benchmark results for typical data access scenarios

| Scenario | Android, msec | Direct, msec | Speedup |
|---|---|---|---|
| Open database | 106 | 29 | 3.66 |
| Process single Customer object | 84 | 25 | 3.36 |
| Traverse all Customer objects | 4475 | 1296 | 3.45 |

Potential effects of using an implementation in accordance with DirectSqlite will be discussed in the following. Recently, research has been performed to understand usage statistics of Sqlite on the Android platform (O. Kennedy, A. Ajay, G. Challen and L. Ziarek, "Pocket data: The need for TPC-MOBILE," in *Technology Conference on Performance Evaluation and Benchmarking*, 2015), the summary statistics of their results is shown in FIG. 23. As it is shown, most database queries are simple SELECT statements and data are usually loaded from database. The second mostly performed operations are simple INSERT and UPSERT. Table 4 shows how much time the CPU has spent processing database statements.

TABLE 4

Total time spent in database operations

| | SELECT | INSERT | UPSERT | UPDATE | DELETE |
|---|---|---|---|---|---|
| Count | 33470310 | 1953279 | 7376648 | 1041967 | 1248594 |
| Avg time, ms | 1.13 | 2.31 | 0.93 | 6.59 | 3.78 |
| Total, seconds | 378215 | 4512.1 | 6860.3 | 6866.6 | 4719.7 |
| Total, Minutes | 630.4 | 75.2 | 114.3 | 114.4 | 78.7 |
| Total, Hours | 10.5 | 1.3 | 1.9 | 1.9 | 1.3 |

Considering SELECT, INSERT, UPSERT and UPDATE operations, which all require transferring data from Java to Native side the total time can be estimated as 10.5+1.3+1.9+1.9=15.6 hours. Because the DirectSqlite method of data transfer is ~3.5 times faster than the standard Android API a potential reduction of CPU time 15.6-15.6/3.5=11.1 hours for each month of typical usage is further estimated. For instance, in the case of SELECT statements alone, if 3 rather than 10.5 hours are used following from the speedup, 7 hours of CPU time are saved, which may also result in battery power savings. Moreover, in FIG. 24, types and numbers of SQL statements executed during the boot, and query features used, are shown.

It should also be noted that the present disclosure provides cross-platform support. FIG. 25 shows an example of such cross-platform code. In particular, support is provided for running the same code on both Android and the JVM.

Summarizing, the present invention relates to an apparatus for extracting data from a database for object initialization, and apparatus for writing object data to a database, a data extraction method, and a method for writing data to a database. The disclosure facilitates fast and memory efficient data exchange between a native side and a virtual machine (VM-)side. In particular, a data extraction kernel on the native-side reads database data from a plurality of locations in the database using a database interface and writes the database data to a buffer using a native-side buffer API (application programming interface). An object initialization kernel on the VM-side reads the database data from the buffer using a native-side buffer API and initializes a plurality of objects. Information indicating one of the plural memory regions in the buffer where the data extraction kernel writes the database data is known to the native-side buffer API and to the VM-side buffer API.

What is claimed is:

1. An apparatus for extracting data from a database, the apparatus comprising:
    a database interface configured to enable communication between the apparatus and the database;
    a virtual machine (VM);
    a buffer comprising a plurality of memory regions;
    a kernel generator configured to generate a data extraction kernel on a native side, and generate an object initialization kernel on a VM-side;
        the data extraction kernel comprising a native-side buffer application programming interface (API), and being configured to read database data from a plurality of locations in the database using the database interface and write the database data to the buffer using the native-side buffer API, the database data corresponding to a query result;
        the object initialization kernel comprising a VM-side buffer API and being configured to read the database data from the buffer using the VM-side buffer API and to initialize a plurality of objects with the database data read from the buffer;
    wherein information indicating one of the plural memory regions in the buffer where the data extraction kernel writes the database data is known to the native-side buffer API and to the VM-side buffer API;
    wherein in generating the data extraction kernel and the object initialization kernel, the kernel generator is further configured to generate:
        the object initialization kernel based on a first isomorphism between respective object types of the plurality of objects and a data format of the region layout in the buffer; and
        the data extraction kernel based on a second isomorphism between a data format of the database data in the database interface and the data format of the region layout in the buffer;
        wherein the first isomorphism and the second isomorphism are input to the kernel generator, the isomorphisms are data structures representing program code.

2. The apparatus according to claim 1, wherein the data extraction kernel comprises a native-side multi-cursor to extract the database data from the database, the native-side multi-cursor comprises a plurality of cursors,
  the object initialization kernel comprises a VM-side multi-cursor to extract the database data from the buffer, the VM-side multi-cursor comprises a plurality of cursors,
  a cursor of the native-side multi-cursor is configured to iterate over items of the database data in one of the plural locations in the database independent of the locations of the other cursors of the native-side multi-cursor, and
  a cursor of the VM-side multi-cursor is configured to iterate over items of the database data synchronously with the iteration of the cursor of the native-side multi-cursor.

3. The apparatus according to claim 2, wherein the cursor of the VM-side multi-cursor is configured to pass an iteration call to the cursor of the native-side multi-cursor, and
  the cursor of the native-side multi-cursor is configured to perform, upon reception of the iteration call, a cursor process synchronously with the VM-side database cursor by reading an item of the database data from the database and writing the item of the database data to the buffer.

4. The apparatus according to claim 3, wherein the plurality of memory regions is located on the native side; the VM-side buffer API comprises a direct buffer on the VM-side,
  the cursor of the native-side multi-cursor is further configured to pass, upon reception of the iteration call, the location of the one of the plural memory regions to the direct buffer, and
  the object initialization kernel is configured to obtain the database data for initializing the objects by accessing the direct buffer.

5. The apparatus according to claim 3, wherein the plurality of memory regions are located on the native side,
  the cursor of the native-side multi-cursor is further configured to create, upon reception of the iteration call, a new direct buffer in the VM-side buffer API and to pass a direct address of the one of the plural memory regions via the buffer API to the direct buffer, and
  the object initialization kernel is configured to obtain the database data for initializing the object by accessing the direct buffer.

6. The apparatus according to claim 1, wherein the plurality of memory regions is located on the VM-side, and the data extraction kernel is configured to write the database data to the buffer via the native-side buffer API.

7. The apparatus according to claim 2, wherein the object initialization kernel is configured to initialize an object of the plurality of objects with the database data within a cursor process for each cursor in the native-side multi-cursor.

8. The apparatus according to claim 1, wherein a data model, an object-relational mapping (ORM), a data access application programming interface (API), a definition of the native-side buffer API and/or a definition of the VM-side buffer API are further input to the kernel generator.

9. The apparatus according to claim 1, wherein the kernel generator generates the object initialization kernel and the data extraction kernel dynamically at runtime.

10. The apparatus according to claim 1, wherein the plurality of objects are a Java objects and the VM is a Java VM.

11. An apparatus for writing data to a database, the apparatus comprising:
  a database interface configured to enable communication between the apparatus and the database;
  a virtual machine (VM);
  a buffer comprising a plurality of memory regions;
  a kernel generator configured to generate an object processing kernel on a VM-side, and a data writing kernel on a native side;
    the object processing kernel comprising a VM-side buffer application programming interface (API), and being configured to write object data from a plurality of objects to the buffer using the VM-side buffer API,
    the data writing kernel comprising a native-side buffer API, and being configured to read the object data from the buffer using the native-side buffer API and write the object data to a plurality of locations in the database using the database interface,
  wherein information indicating one of the plural memory regions in the buffer where the object processing kernel writes the object data is known to the native-side buffer API and to the VM-side buffer API;
  wherein in generating the object processing kernel and the data writing kernel, the kernel generator is further configured to generate:
    the object processing kernel based on a first isomorphism between respective object types of the plurality of objects and a data format of the region layout in the buffer, and
    the data writing kernel based on a second isomorphism between a data format of the database data in the database interface and the data format of the region layout in the buffer;
  wherein the first isomorphism and the second isomorphism are input to the kernel generator, the isomorphisms are data structures representing program code.

12. A method for extracting data from a database, wherein the method is applied to an apparatus for extracting the data from the database, and the method comprises:
  generating a data extraction kernel on a native side, and generating an object initialization kernel on a virtual machine (VM)-side,
    the data extraction kernel comprising a native-side buffer application programming interface (API), and being configured to read database data from a plurality of locations in the database using the database interface and write the database data to the buffer using the native-side buffer API, the database data corresponding to a query result,
    the object initialization kernel comprising a VM-side buffer API and being configured to read the database data from the buffer using the VM-side buffer API and to initialize a plurality of objects with the database data read from the buffer,
  reading the database data from a plurality of locations in the database using a database interface, the database data corresponding to a query result,
  writing the database data to a buffer comprising a plurality of memory regions using the native-side buffer API,
  reading database data from the buffer using a virtual machine (VM-side buffer API, and
  initializing a plurality of objects with the database data read from the buffer,
  wherein information indicating one of the plural memory regions in the buffer where database data is written known to the native-side buffer API and to the VM-side buffer API;
  wherein generation of the object initialization kernel is based on a first isomorphism between respective object types of the plurality of objects and a data format of the region layout in the buffer; and generation of the data extraction kernel is based on a second isomorphism between a data format of the database data in the database interface and the data format of the region layout in the buffer;

wherein the first isomorphism and the second isomorphism are input to the kernel generator, the isomorphisms are data structures representing program code.

13. A method for writing data to a database, wherein the method is applied to an apparatus for writing the data to the database, and the method comprises:

generating an object processing kernel on a virtual machine (VM)-side, and a data writing kernel on a native side;

the object processing kernel comprising a VM-side buffer application programming interface (API), and being configured to write object data from a plurality of objects to the buffer using the VM-side buffer API, the data writing kernel comprising a native-side buffer API, and being configured to read the object data from the buffer using the native-side buffer API and write the object data to a plurality of locations in the database using the database interface;

writing the object data from a plurality of objects to the buffer using the VM-side buffer API, reading the object data from the buffer using a native-side buffer API, and writing the object data to a plurality of locations in the database using the database interface, wherein information indicating one of the plural memory regions in the buffer where the object data is written is known to the native-side buffer API and to the VM-side buffer API;

wherein generation of the object processing kernel is based on a first isomorphism between respective object types of the plurality of objects and a data format of the region layout in the buffer, and generation of the data writing kernel is based on a second isomorphism between a data format of the database data in the database interface and the data format of the region layout in the buffer;

wherein the first isomorphism and the second isomorphism are input to the kernel generator, the isomorphisms are data structures representing program code.

14. A non-transitory computer readable medium storing instructions causing a computer to perform a method according to claim 13.

15. A non-transitory computer readable medium storing instructions causing a computer to perform a method according to claim 14.

16. The method according to claim 12, further comprising:

iterating over items of the database data in one of the plural locations in the database independent of the locations of the other cursors of the native-side multi-cursor, and iterating over items of the database data synchronously with the iteration of the cursor of the native-side multi-cursor.

* * * * *